US009400684B2

(12) United States Patent
Tsukuda

(10) Patent No.: US 9,400,684 B2
(45) Date of Patent: Jul. 26, 2016

(54) ELECTRONIC APPARATUS, RECORDING MEDIUM, AND METHOD FOR GENERATING WORKFLOW

(71) Applicant: KYOCERA Document Solutions Inc., Osaka-shi, Osaka (JP)

(72) Inventor: Wataru Tsukuda, Osaka (JP)

(73) Assignee: KYOCERA DOCUMENT SOLUTIONS INC., Osaka-shi, Osaka (JP)

( * ) Notice: Subject to any disclaimer, the term of this patent is extended or adjusted under 35 U.S.C. 154(b) by 0 days.

(21) Appl. No.: 14/602,310

(22) Filed: Jan. 22, 2015

(65) Prior Publication Data

US 2015/0212854 A1 Jul. 30, 2015

(30) Foreign Application Priority Data

Jan. 29, 2014 (JP) ................................ 2014-014305

(51) Int. Cl.
*G06F 9/46* (2006.01)
*G06F 9/48* (2006.01)

(52) U.S. Cl.
CPC ............. *G06F 9/4881* (2013.01); *G06F 9/466* (2013.01)

(58) Field of Classification Search
CPC ............................... G06F 9/4881; G06F 9/466
USPC ......................................................... 718/102
See application file for complete search history.

(56) References Cited

U.S. PATENT DOCUMENTS 5,799,297 A * 8/1998 Goodridge ............ G06Q 10/04
7,191,410 B1 * 3/2007 Kruempelmann .... G06F 9/4443 707/E17.005
8,203,740 B2 6/2012 Yagi
8,479,095 B2 * 7/2013 Nagamine .......... H04N 1/00222 715/273
9,256,459 B2 * 2/2016 Sasaki ...................... G06F 9/46

(Continued)

FOREIGN PATENT DOCUMENTS

JP 2009177231 A 8/2009

OTHER PUBLICATIONS

Ellis et al. "Dynamic Change Within Workflow Systems", 1995, ACM.*

(Continued)

*Primary Examiner* — Anna Deng
*Assistant Examiner* — Junchun Wu

(57) ABSTRACT

An electronic apparatus generates a workflow for processing data with a plurality of functions in combination. The electronic apparatus includes a function accepting unit and a workflow generating unit. The functions accepted include an edit function that edits data based on settings and an execution result notification function that indicates an execution result obtained from the functions executed before the execution result notification function in the workflow. The execution result notification function indicates that it can accept a return instruction, and upon acceptance of the return instruction, the execution result notification function returns the execution position to the function specified by the accepted return instruction. After the execution position is returned in response to the return instruction, the settings of at least one of the edit functions located between the function specified by the return instruction and the execution result notification function in the workflow can be changed.

8 Claims, 17 Drawing Sheets

10 MFP

11 OPERATION UNIT
12 DISPLAY UNIT
13 SCANNER
14 PRINTER
15 FAX COMMUNICATION UNIT
16 NETWORK COMMUNICATION UNIT
18 CONTROL UNIT
18a FUNCTION ACCEPTING UNIT
18b WORKFLOW GENERATING UNIT
17 STORAGE UNIT
20 WORKFLOW
17a WORKFLOW GENERATING PROGRAM

(56) References Cited

U.S. PATENT DOCUMENTS

2010/0138835 A1* 6/2010 Yagi .................... G06Q 10/06 718/100
2011/0088067 A1* 4/2011 Azuma ................ H04N 5/4403 725/58
2012/0150947 A1* 6/2012 Yu .......................... H04L 41/28 709/203
2012/0167110 A1* 6/2012 Mizuno ................ G06F 9/5083 718/103
2013/0326526 A1* 12/2013 Sasaki ...................... G06F 9/46 718/102
2014/0133838 A1* 5/2014 Hosokawa .......... G11B 27/036 386/290

OTHER PUBLICATIONS

Yu et al. "Multi-objective Planning for Workflow Execution on Grids", 2007, IEEE.*

* cited by examiner

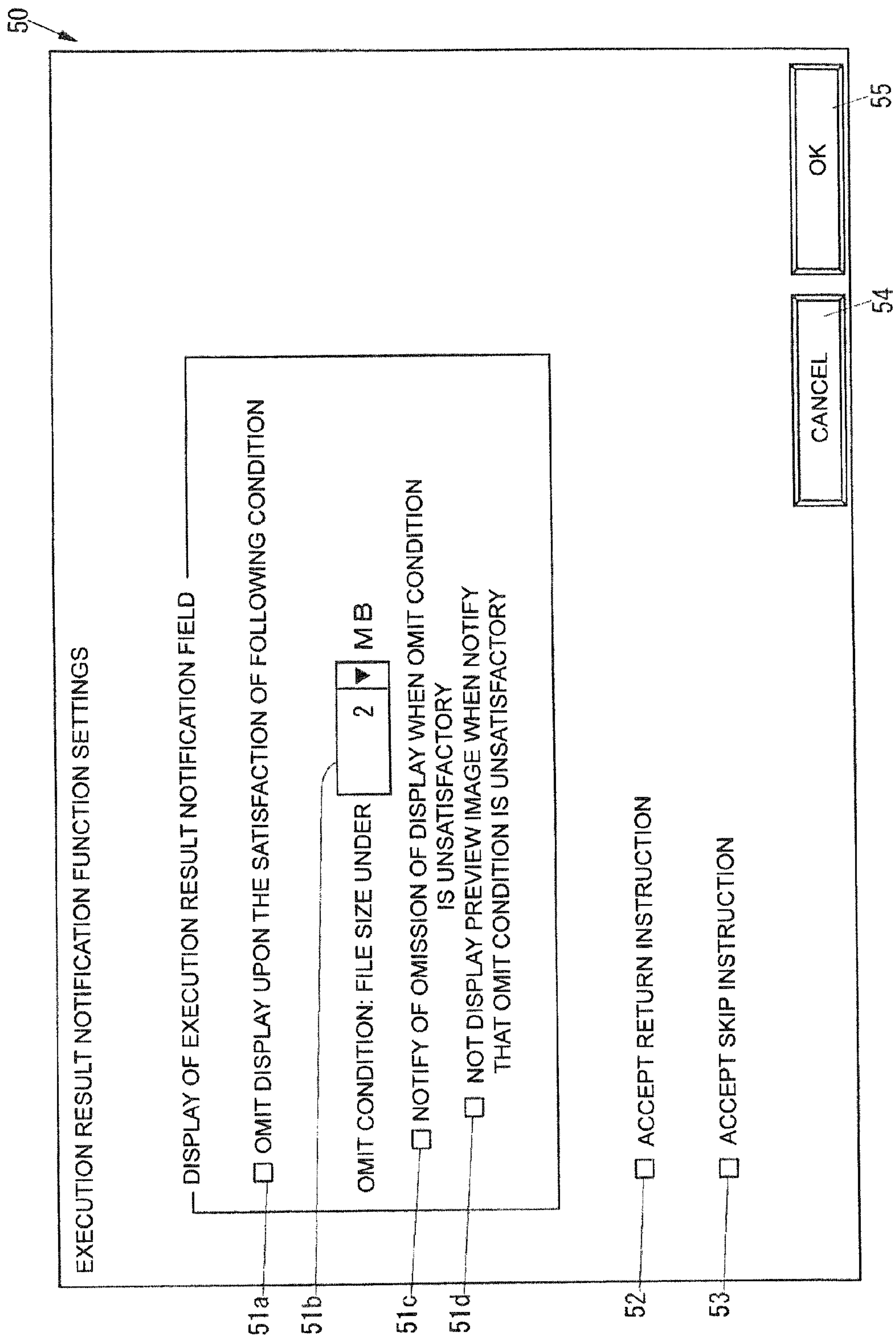

FIG.6
50
EXECUTION RESULT NOTIFICATION FUNCTION SETTINGS
DISPLAY OF EXECUTION RESULT NOTIFICATION FIELD
OMIT DISPLAY UPON THE SATISFACTION OF FOLLOWING CONDITION
OMIT CONDITION: FILE SIZE UNDER
2
M B
NOTIFY OF OMISSION OF DISPLAY WHEN OMIT CONDITION IS UNSATISFACTORY
NOT DISPLAY PREVIEW IMAGE WHEN NOTIFY THAT OMIT CONDITION IS UNSATISFACTORY
ACCEPT RETURN INSTRUCTION
ACCEPT SKIP INSTRUCTION
CANCEL
OK
51a
51b
51c
51d
52
53
54
55

70
CURRENT SETTING
SIMILAR SETTING CANDIDATES
INTENSITY + 2
INTENSITY + 3
INTENSITY + 1
SATURATION + 2
MAGNIFICATION 50%
MAGNIFICATION 60%
MAGNIFICATION 40%
LAYOUT 2 IN 1
EDIT BASED ON SELECTED SETTINGS
EDIT AFTER SPECIFYING DETAILED SETTINGS
71
73a
72
73b
73c
73d
74
76a
75
76b
76c
76d
77
78

60
61
62
STEP1
SCAN
STEP2
EDIT
STEP3
EXECUTION RESULT NOTIFICATION
STEP4
EDIT
STEP5
EXECUTION RESULT NOTIFICATION
STEP6
PRINT
PREVIEW
GO TO
NEXT
RETU-RN TO
STEP 2
OK
80
81
82
83
84
85
86

60
61
62
80
82
83
84
85
86
87
STEP1
SCAN
STEP2
EDIT
STEP3
EXECUTION RESULT NOTIFICATION
STEP4
SERVER OUTPUT
GO TO
NEXT
RETU-RN TO
STEP 2
OK
FILE SIZE OF IMAGE DATA IS 2 MB OR LARGER.

ELECTRONIC APPARATUS, RECORDING MEDIUM, AND METHOD FOR GENERATING WORKFLOW

INCORPORATION BY REFERENCE

The disclosure of Japanese Patent Application No. 2014-14305 filed on Jan. 29, 2014 including the specification, drawings and abstract is incorporated herein by reference in its entirety.

BACKGROUND

This disclosure relates to an electronic apparatus that generates a workflow for data processing with a plurality of functions in combination, a recording medium, and a method for generating the workflow.

Conventionally, electronic apparatuses that generate a workflow for data processing with a plurality of functions in combination are known. When a workflow generated by a conventional electronic apparatus starts running, functions included in the workflow are executed in a sequential order. The workflow generated by the conventional electronic apparatus may sometimes include an edit function that edits data based on settings and an execution result notification function that indicates an execution result obtained from the functions executed before the execution result notification function in the workflow. The execution result notification function can accept an instruction to continue executing the workflow and an instruction to suspend the workflow under execution.

SUMMARY

An electronic apparatus according to an aspect of the present disclosure generates a workflow for data processing with a plurality of functions in combination. The electronic apparatus includes a function accepting unit and a workflow generating unit. The function accepting unit accepts functions. The workflow generating unit generates a workflow including a plurality of the functions accepted by the function accepting unit. The functions accepted by the function accepting unit includes an edit function that edits data based on settings and an execution result notification function that indicates an execution result obtained from the functions executed before the execution result notification function in the workflow. The execution result notification function indicates that it can accept a return instruction that allows the execution position of the workflow to return to a function located before the execution result notification function, and upon acceptance of the return instruction, the execution result notification function returns the execution position to the function specified by the accepted return instruction. The settings of at least one of the edit functions located between the function specified by the return instruction and the execution result notification function in the workflow can be changed after the execution position is returned based on the return instruction.

BRIEF DESCRIPTION OF THE DRAWINGS

FIG. 6 illustrates an execution result notification function setting screen displayed on the display unit in FIG. 1.

DETAILED DESCRIPTION

With reference to the accompanying drawings, an embodiment of the present disclosure will be described below.

First, the configuration of a multifunction peripheral (MFP), which is an electronic apparatus according to the embodiment, will be described.

Figure 1:
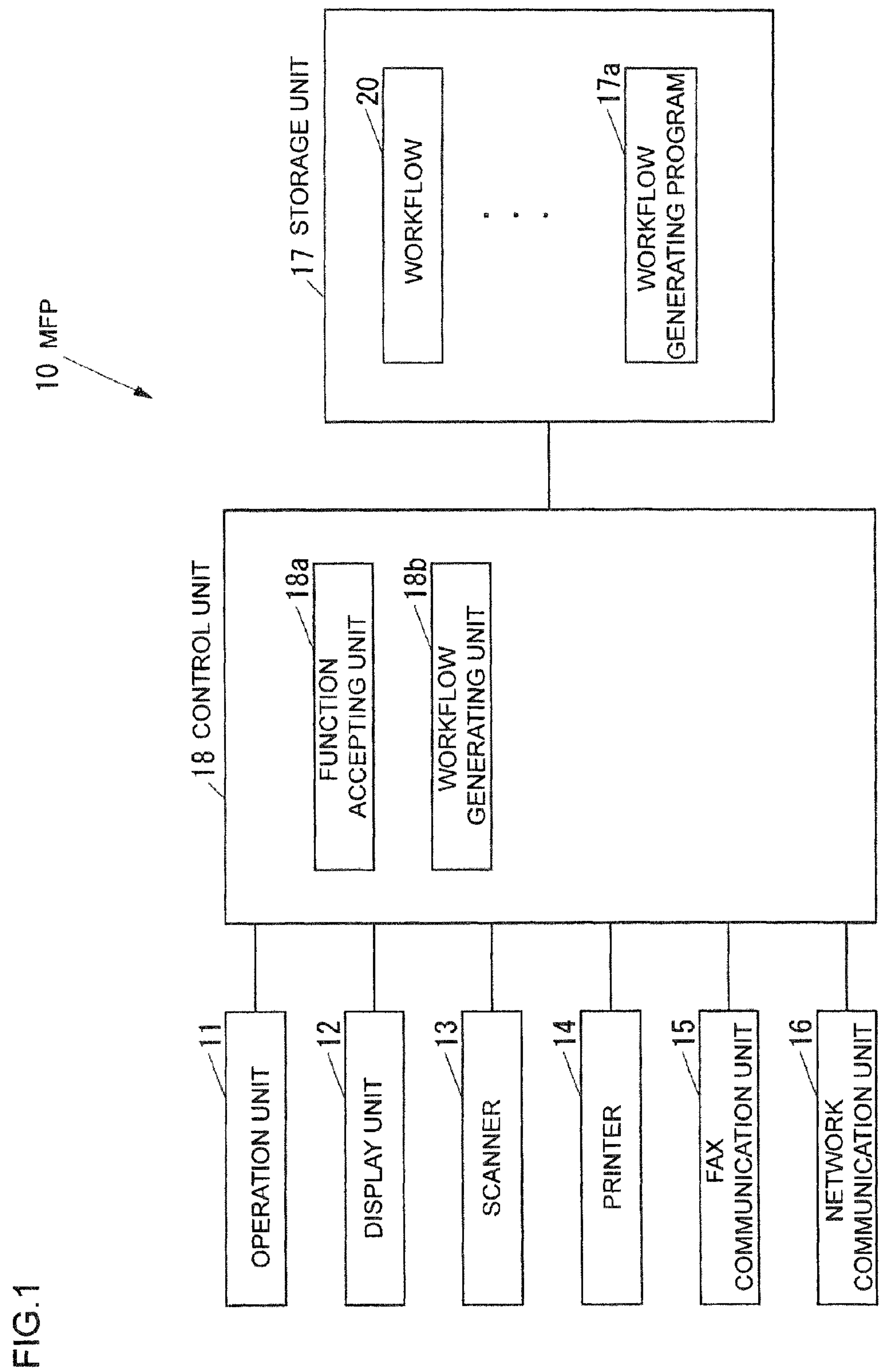
FIG. 1 shows the configuration of an MFP according to an embodiment of the present disclosure.

FIG. 1 shows the configuration of an MFP 10 according to the embodiment.

As shown in FIG. 1, the MFP 10 includes an operation unit 11, a display unit 12, a scanner 13, a printer 14, a fax communication unit 15, a network communication unit 16, a storage unit 17, and a control unit 18. The operation unit 11 is an input device, such as a button, through which various operations are input by users. The display unit 12 is a display device, such as a liquid crystal display (LCD), used to display various items of information. The scanner 13 is a reading device that reads image data from an original document. The printer 14 is a printing device that performs a print operation on recording media or paper. The fax communication unit 15 is a facsimile device that performs fax communication with external facsimile devices via a communication line, such as a public telephone line. The network communication unit 16 is a network communication device that communicates with external devices via a network, such as a local area network (LAN) and the Internet. The storage unit 17 is a nonvolatile storage device, such as an electrically erasable programmable read only memory (EEPROM) and a hard disk drive (HDD), that stores various types of data. The control unit 18 controls the entire MFP 10.

The storage unit 17 can store a plurality of workflows 20 each composed of a plurality of functions in combination.

The storage unit 17 stores a workflow generating program 17_a_ used by the MFP 10 to generate a workflow 20. The workflow generating program 17_a_ may be installed into the MFP 10 at a manufacturing stage of the MFP 10, may be additionally installed into the MFP 10 from a recording medium, such as an SD card and a universal serial bus (USB) memory, or may be additionally installed into the MFP 10 through a network.

Figure 2:
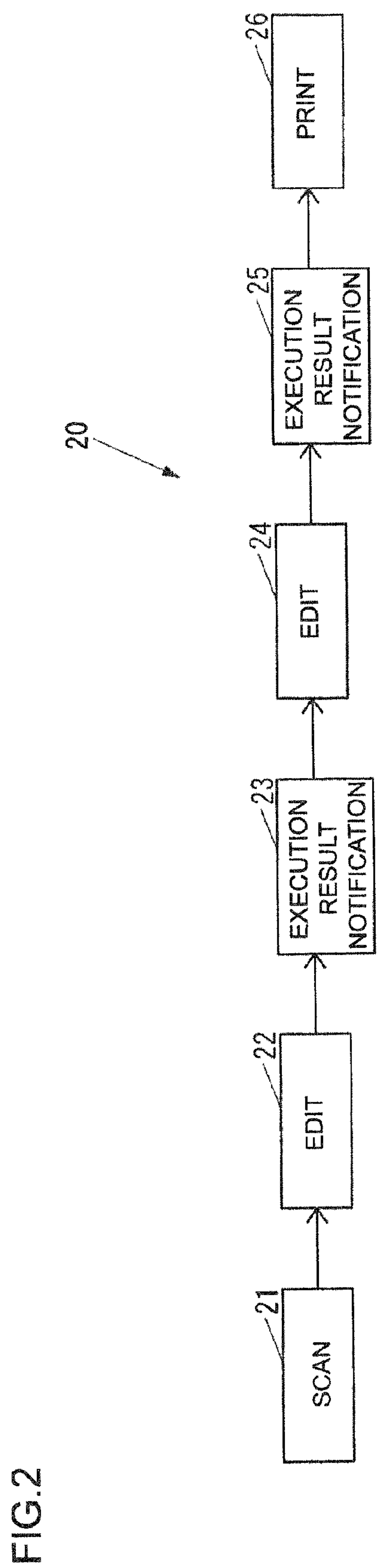
FIG. 2 illustrates a workflow generated by the MFP in FIG. 1.

FIG. 2 illustrates a workflow 20 generated by the MFP 10.

The workflow 20 shown in FIG. 2 is generated to process image data through the following functions in combination: a scanning function 21 of reading image data from an original document by using the scanner 13 (see FIG. 1); an edit function 22 of editing the image data based on settings; an execution result notification function 23 of indicating an execution result obtained from the functions executed before the execution result notification function 23 in the workflow 20; an edit function 24 of editing the image data based on settings; an execution result notification function 25 of indicating an execution result obtained from the functions executed before the execution result notification function 25 in the workflow 20; and a printing function 26 of performing a print operation on a recording medium based on the image data by using the printer 14 (see FIG. 1). The workflow 20 shown in FIG. 2 is performed in the order of the scanning function 21, edit function 22, execution result notification function 23, edit function 24, execution result notification function 25, and printing function 26.

The control unit 18 shown in FIG. 1 includes, for example, a central processing unit (CPU), a read only memory (ROM), which stores programs and various items of data, and a random access memory (RAM), which is used as a work area of the CPU. The CPU runs the programs stored in the ROM or the storage unit 17.

The control unit 18 functions as a function accepting unit 18*a* that accepts functions and a workflow generating unit 18*b* that generates workflows 20 including the functions accepted by the function accepting unit 18*a* by executing a workflow generating program 17*a* stored in the storage unit 17.

Next, the operation of the MFP 10 to generate a workflow 20 will be described.

Figure 3:
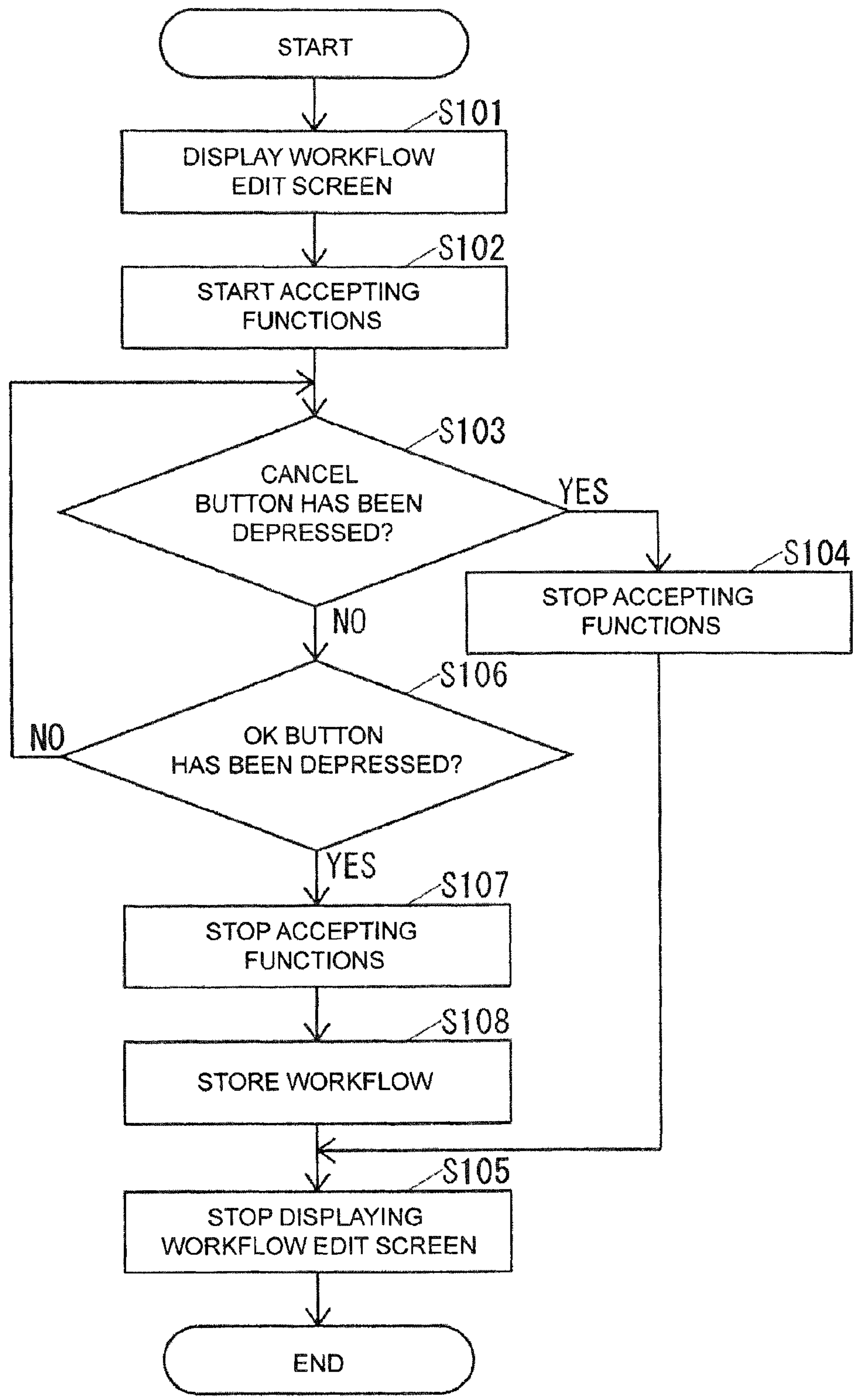
FIG. 3 is a flow chart showing the operation of the MFP in FIG. 1 to generate a workflow.

Upon receipt of an instruction to start processing for generating a workflow 20 from the operation unit 11, the control unit 18 executes the workflow generating program 17*a* to start the operation shown in FIG. 3.

FIG. 3 is a flow chart showing the operation of the MFP 10 to generate the workflow 20.

Figure 4:
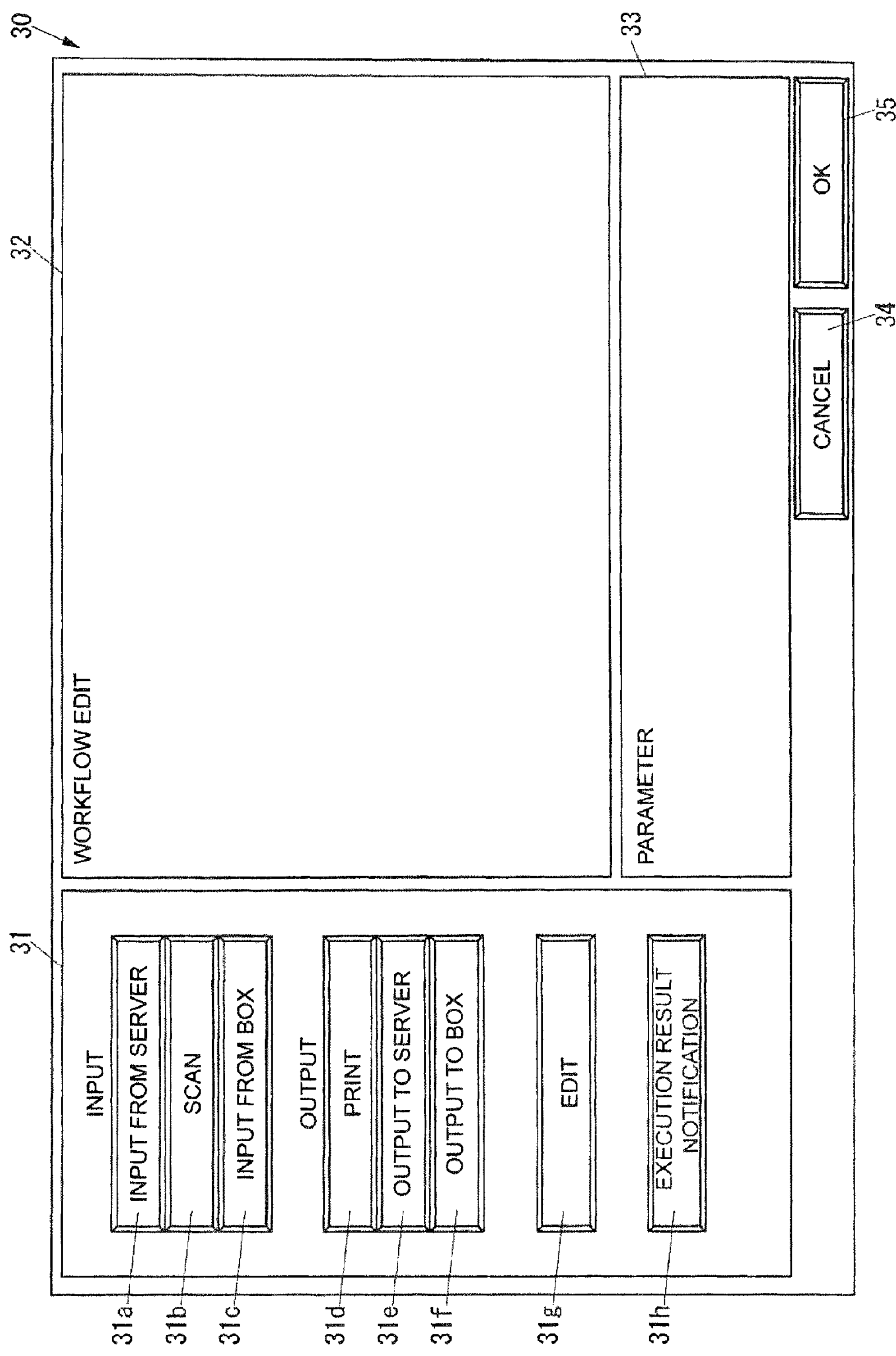
FIG. 4 illustrates a workflow edit screen displayed on a display unit in FIG. 1.

As shown in FIG. 3, the control unit 18 displays a workflow edit screen 30 shown in FIG. 4 on the display unit 12 (S101).

FIG. 4 shows an example of the workflow edit screen 30 to be displayed on the display unit 12 in FIG. 1.

The workflow edit screen 30 in FIG. 4 includes a function selection field 31 used to select various functions to make up a workflow, a workflow edit field 32 used to edit the workflow, a parameter field 33 used to display various settings of each function in the workflow, a CANCEL button 34 to abort the generation of the workflow, and an OK button 35 to store the workflow edited in the workflow edit field 32 in the storage unit 17, the workflow being stored as a workflow 20.

The function selection field 31 includes buttons 31*a* to 31*c* used to add an icon of a function for inputting image data (hereinafter, referred to as "input function") to the workflow edit field 32, buttons 31*d* to 31*f* used to add an icon of a function for outputting the image data (hereinafter, referred to as "output function") to the workflow edit field 32, a button 31*g* used to add an icon of the edit function to the workflow edit field 32, and a button 31*h* used to add an icon of the execution result notification function to the workflow edit field 32.

The button 31*a* is assigned with a server input function of inputting image data from an external server of the MFP 10 (see FIG. 1) via the network communication unit 16 (see FIG. 1). The button 31*b* is assigned with a scanning function of reading image data from an original document through the use of the scanner 13 (see FIG. 1). The button 31*c* is assigned with a BOX input function of inputting image data from a User Box, which is a storage area provided in the storage unit 17 (see FIG. 1) for every user. The button 31*d* is assigned with a printing function of performing a print operation on a recording medium based on the image data through the use of the printer 14 (see FIG. 1). The button 31*e* is assigned with a server output function of outputting image data to an external server of the MFP 10 via the network communication unit 16. The button 31*f* is assigned with a BOX output function of outputting image data to the User Box.

An example of the workflow edited on the workflow edit field 32 is shown in FIG. 2.

As shown in FIG. 3, the function accepting unit 18*a* of the control unit 18 starts accepting functions after the process in S101 (S102). Specifically, the function accepting unit 18*a* accepts functions by operating the function selection field 31 and workflow edit field 32.

Users can generate a workflow on the workflow edit field 32 by manipulating the operation unit 11 to operate the function selection field 31 and workflow edit field 32 on the workflow edit screen 30. For example, a user operates the buttons 31*a* to 31*h* to add icons corresponding to the buttons to the workflow edit field 32. In addition, the user can add arrows to the workflow edit field 32 by providing instructions to link the icons displayed on the workflow edit field 32 through the operation unit 11. The arrows indicate the order in which the functions represented in the form of the icons are performed. The user can also delete any icons from the workflow edit field 32 by inputting an instruction through the operation unit 11 to delete the icons displayed on the workflow edit field 32.

The user selects an icon in the workflow edit field 32 on the workflow edit screen 30 and performs a specific operation on the selected icon through the operation unit 11, thereby specifying settings of the function corresponding to the selected icon. If an icon in the workflow edit field 32 on the workflow edit screen 30 is selected through the operation unit 11, the function accepting unit 18*a* displays settings of the function corresponding to the selected icon in the parameter field 33. The following shows examples of the settings of the edit function and execution result notification function.

Figure 5:
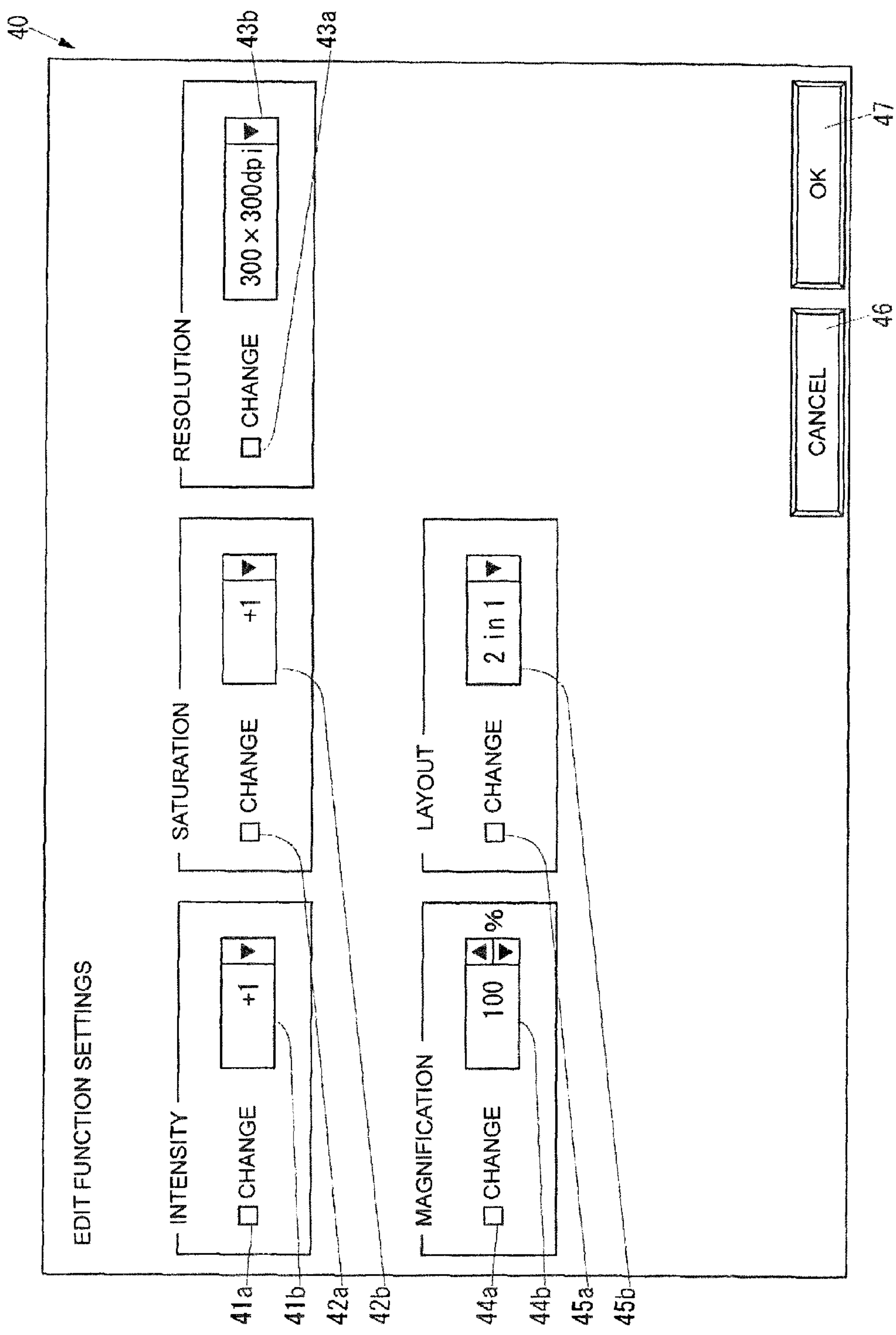
FIG. 5 illustrates an edit function setting screen displayed on the display unit in FIG. 1.

If the user selects an icon of an edit function in the workflow edit field 32 on the workflow edit screen 30 through the operation unit 11 and performs a specific operation on the selected icon, the function accepting unit 18*a* displays an edit function setting screen 40, shown in FIG. 5, on the display unit 12.

FIG. 5 shows an example of the edit function setting screen 40 to be displayed on the display unit 12.

The edit function setting screen 40 in FIG. 5 includes: a checkbox 41*a* used to choose whether to change the intensity of an image; a pull down menu 41*b* used to set the resultant intensity when the change of intensity is chosen; a checkbox 42*a* used to choose whether to change the saturation of the image; a pull down menu 42*b* used to set the resultant saturation when the change of saturation is chosen; a checkbox 43*a* used to choose whether to change the resolution of the image; a pull down menu 43*b* used to set the resultant resolution when the change of resolution is chosen; a checkbox 44*a* used to choose whether to rescale the image; a spin box 44*b* used to set the resultant magnification when the rescaling of the image is chosen; a checkbox 45a used to choose whether to lay out a plurality of images on one page; a pull down menu 45b used to set a layout when the change of layout is chosen; a CANCEL button 46 used to abort changing the settings of the edit function; and an OK button 47 used to confirm the settings, as settings of the edit function, specified by the checkbox 41a, pull down menu 41b, checkbox 42a, pull down menu 42b, checkbox 43a, pull down menu 43b, checkbox 44a, spin box 44b, checkbox 45a, and pull down menu 45b.

The options listed in the pull down menu 41b include "−3", "−2", "−1", "+1", "+2", "+3" on the edit function setting screen 40 in FIG. 5. The negative numbers are used to reduce the intensity, and the negative numbers with greater magnitude denote lower intensity. The positive numbers are used to increase the intensity, and the positive numbers with greater magnitude denote higher intensity.

The options listed in the pull down menu 42b include "−3", "−2", "−1", "+1", "+2", "+3" on the edit function setting screen 40 in FIG. 5. The negative numbers are used to reduce the saturation, and the negative numbers with greater magnitude denote lower saturation. The positive numbers are used to increase the saturation, and the positive numbers with greater magnitude denote higher saturation.

The options listed in the pull down menu 43b include, for example, "300×300 dpi", "600×600 dpi", etc. on the edit function setting screen 40 in FIG. 5.

With the use of the spin box 44b, the user can input a magnification, for example, in a range of 25% to 400% in increments or decrements of 1%.

The options listed in the pull down menu 45b include, for example, "2 in 1", "4 in 1", etc. on the edit function setting screen 40 in FIG. 5.

Thus, the user can select an edit function by selecting the corresponding icon in the workflow edit field 32 on the workflow edit screen 30 through the operation unit 11 and can specify the settings of the edit function on the edit function setting screen 40 in FIG. 5.

If the user selects an icon of an execution result notification function on the workflow edit field 32 on the workflow edit screen 30 through the operation unit 11 and performs a specific operation on the selected icon, the function accepting unit 18a displays an execution result notification function setting screen 50, shown in FIG. 6, on the display unit 12.

FIG. 6 shows an example of the execution result notification function setting screen 50 to be displayed on the display unit 12.

The execution result notification function setting screen 50 in FIG. 6 includes: a checkbox 51a used to choose whether to omit displaying an execution result notification field, which will be described later, upon the satisfaction of a specific condition (hereinafter, referred to as "an omit condition"); a pull down menu 51b used to set the omit condition; a checkbox 51c used to choose whether to indicate that the omit condition has not been satisfied, if the omit condition has not been satisfied when omission of the display of the execution result notification field upon the satisfaction of the omit condition is chosen; a checkbox 51d used to chose whether to display a preview image when the notification that the omit condition is not satisfied is provided; a checkbox 52 used to choose whether to accept a return instruction to return the execution position of a workflow to a function before the execution result notification function; a checkbox 53 used to choose whether to accept a skip instruction to move the execution position of a workflow to a function after the function immediately after the execution result notification function; a CANCEL button 54 used to abort setting the execution result notification function; and an OK button 55 used to confirm the settings, as settings of the execution result notification function, specified by the checkbox 51a, pull down menu 51b, checkbox 51c, checkbox 51d, checkbox 52, and checkbox 53.

The pull down menu 51b is used to select a threshold of the file size of the image data to omit displaying the execution result notification field.

Thus, the user can select an execution result notification function by selecting the corresponding icon in the workflow edit field 32 on the workflow edit screen 30 through the operation unit 11 and can specify the settings of the execution result notification function on the execution result notification function setting screen 50 shown in FIG. 6.

As shown in FIG. 3, after the process in S102, the function accepting unit 18a determines whether the CANCEL button 34 has been depressed (S103).

If the function accepting unit 18a determines that the CANCEL button 34 has been depressed in S103, the function accepting unit 18a stops accepting functions (S104).

Then, the control unit 18 stops displaying the workflow edit screen 30 on the display unit 12 (S105) to terminate the operation shown in FIG. 3.

If the function accepting unit 18a determines that the CANCEL button 34 has not been depressed in S103, the function accepting unit 18a determines whether the OK button 35 has been depressed (S106).

If the function accepting unit 18a determines that the OK button 35 has not been depressed in S106, the function accepting unit 18a performs the process in S103.

If the function accepting unit 18a determines that the OK button 35 has been depressed in S106, the function accepting unit 18a stops accepting functions (S107).

Then, the workflow generating unit 18b of the control unit 18 stores the workflow edited in the workflow edit field 32 as a workflow 20 in the storage unit 17 (S108).

Then, the control unit 18 stops displaying the workflow edit screen 30 on the display unit 12 (S105) to terminate the operation shown in FIG. 3.

Next, the operation of the MFP 10 to execute the workflow 20 will be described.

Figure 7:
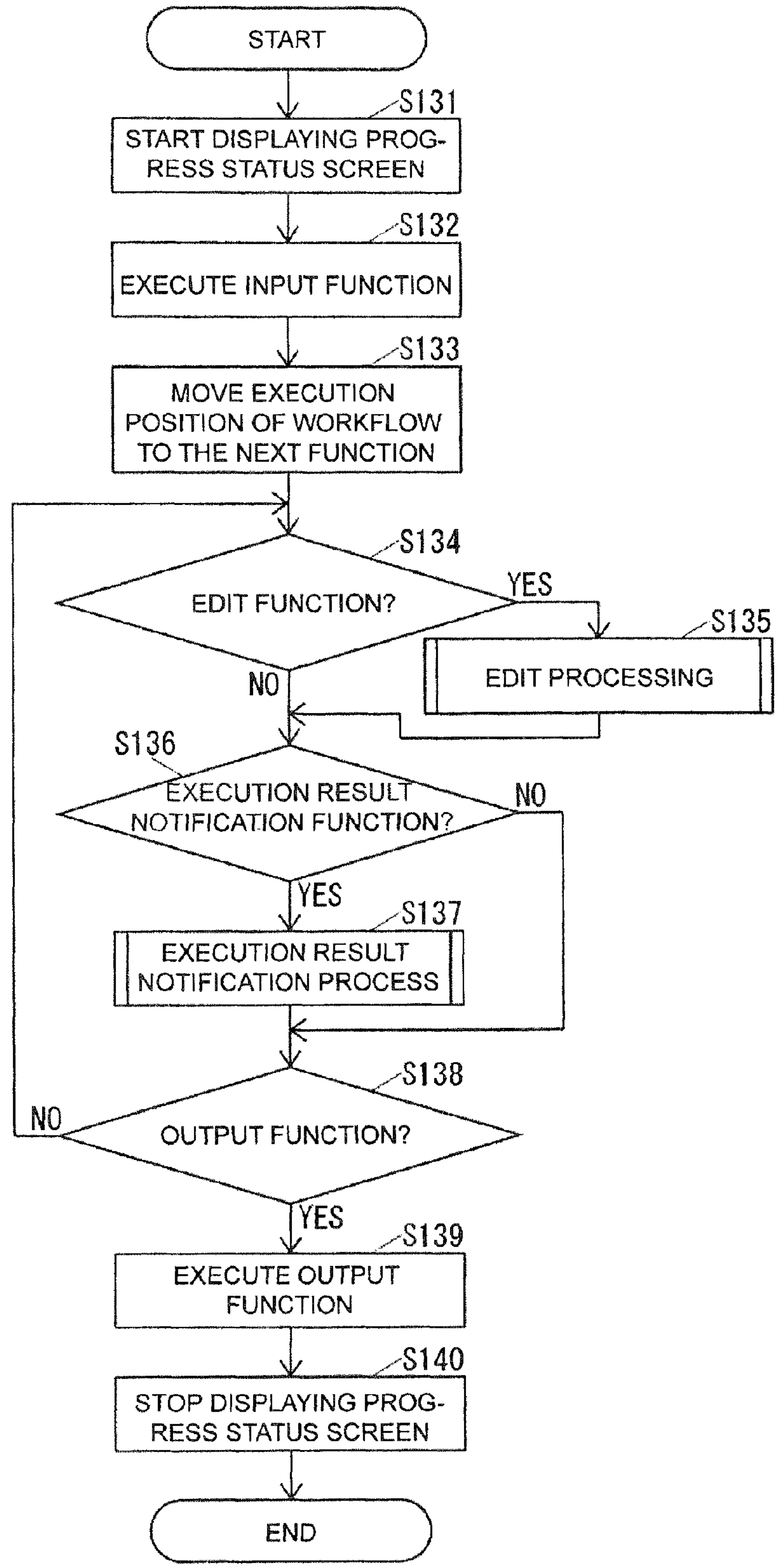
FIG. 7 is a flow chart showing the operation of the MFP in FIG. 1 to execute a workflow.

After one of the workflows 20 stored in the storage unit 17 is selected through the operation unit 11 and then an instruction to start executing the selected workflow 20 is provided through the operation unit 11, the control unit 18 starts the operation shown in FIG. 7.

FIG. 7 is a flow chart showing the operation of the MFP 10 to execute the workflow 20.

Figure 8:
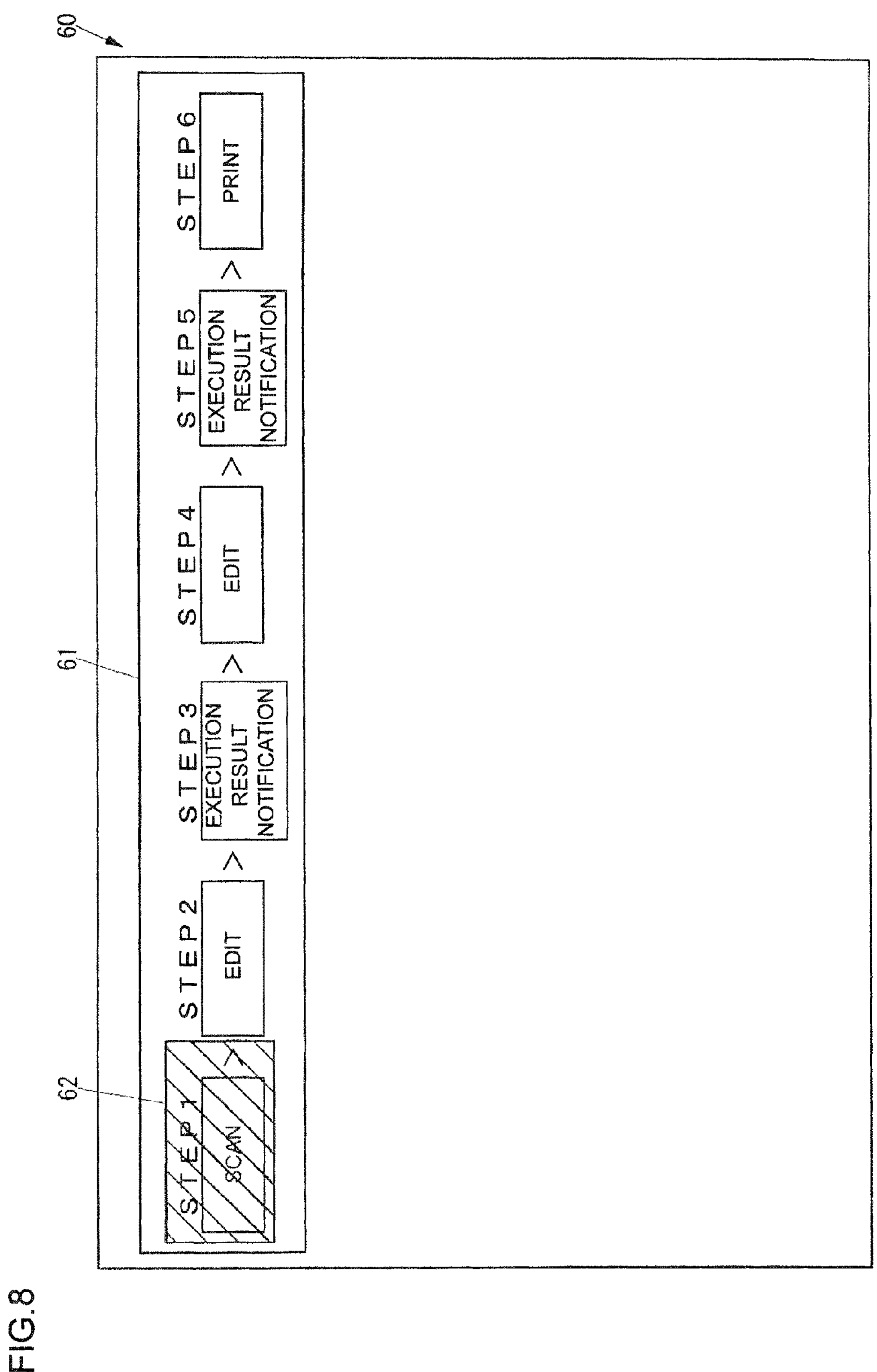
FIG. 8 illustrates a progress status screen displayed on the display unit in FIG. 1.

As shown in FIG. 7, the control unit 18 starts displaying a progress status screen 60, as shown in FIG. 8, on the display unit 12 (S131). The progress status screen 60 indicates the progress of the workflow 20 under execution.

FIG. 8 shows an example of the progress status screen 60 to be displayed on the display unit 12.

As shown in FIG. 8, the progress status screen 60 includes a workflow display field 61 that indicates a workflow 20 under execution, and the functions that have been already executed in the workflow 20 are enclosed by, for example, a hatched area 62. The progress status screen 60 shown in FIG. 8 represents that the scanning function in STEP 1 in the workflow 20 has been already executed.

As shown in FIG. 7, after the process in S131, the control unit 18 executes an input function located at the first position of the workflow 20 (S132). Image data input in S132 is defined as target image data through the subsequent processes.

If the input function located at the first position of the workflow 20 is a server input function and the settings of the server input function, such as a server, a communication mode, and a path, are determined in advance, more specifically, at the time of generation of the workflow 20, the control unit 18 inputs image data at the predetermined path from the predetermined server by the predetermined communication mode through the network communication unit 16. Input of the server input function settings, including the server, communication mode, path and so on, can be made through the operation unit 11 at the time of execution of the server input function.

Alternatively, if the input function located at the first position of the workflow 20 is a scanning function and the settings of the scanning function, such as the resolution and the number of colors, are determined in advance, the control unit 18 inputs image data by reading the image data from an original document using the scanner 13, for example, in the predetermined resolution with the predetermined colors and so on. Input of the scanning function settings, including the resolution and the number of colors, can be made through the operation unit 11 at the time of execution of the scanning function.

Alternatively, if the input function located at the first position of the workflow 20 is a BOX input function and the settings of the BOX input function, such as a file name, are determined in advance, the control unit 18 inputs image data, for example, of the predetermined file name from a User Box of a user who has logged in to the MFP 10. Input of the BOX input function settings, including the file name, can be made through the operation unit 11 at the time of execution of the BOX input function.

After the process in S132, the control unit 18 moves the execution position of the workflow 20 to the next function (S133).

Then, the control unit 18 determines whether the function currently located in the execution position of the workflow 20 is an edit function (S134).

Figure 9:
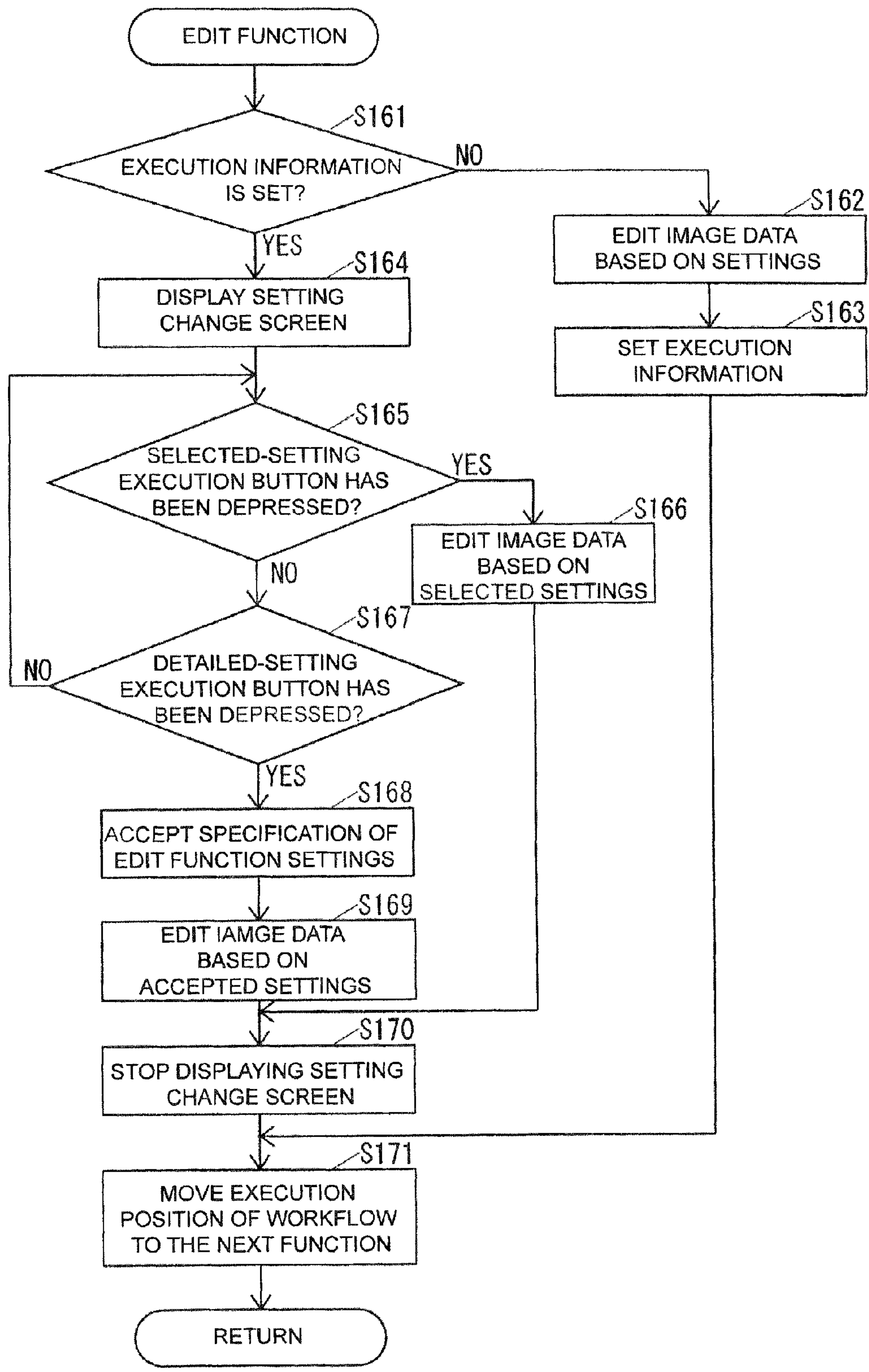
FIG. 9 is a flow chart of edit processing shown in FIG. 7.

If the control unit 18 determines that the function currently located in the execution position is an edit function in S134, the control unit 18 executes the edit function to perform edit processing as shown in FIG. 9 (S135).

FIG. 9 is a flow chart of the edit processing shown in FIG. 7.

As shown in FIG. 9, the control unit 18 determines whether execution information, which indicates that the function has been executed on the target image data, is set to the edit function currently located in the execution position (hereinafter, "object edit function") (S161).

If the control unit 18 determines in S161 that the execution information has not been set to the object edit function, the control unit 18 edits the target image data (S162) based on the settings determined in advance on the edit function setting screen 40 to execute the object edit function. Input of the edit function settings can be made through the operation unit 11 at the time of the execution of the edit function.

Then, the control unit 18 sets execution information to the object edit function (S163).

Figure 10:
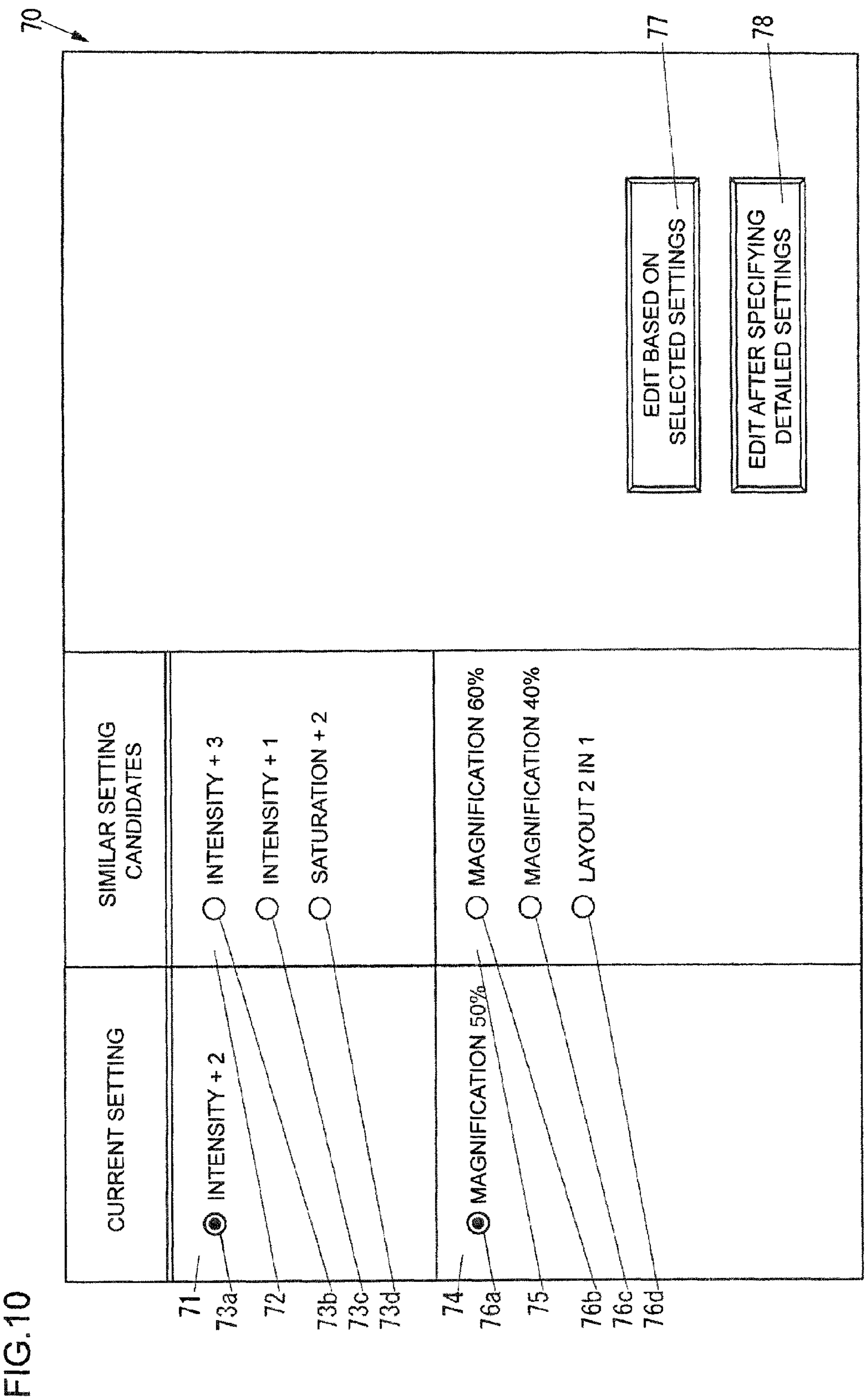
FIG. 10 illustrates a setting change screen displayed on the display unit in FIG. 1.

If the control unit 18 determines in S161 that the execution information has been set to the object edit function, the control unit 18 displays a setting change screen 70, as shown in FIG. 10, on the display unit 12 (S164) to change the settings.

FIG. 10 shows an example of the setting change screen 70 to be displayed on the display unit 12.

The setting change screen 70 shown in FIG. 10 includes: a current setting display field 71 indicating one setting currently chosen; an alternate setting display field 72 indicating setting candidates similar to the current setting indicated in the current setting display field 71; a radio button 73*a* used to select the setting indicated in the current setting display field 71; radio buttons 73*b* to 73*d* used to select the settings indicated in the alternate setting display field 72; a current setting display field 74 indicating one setting currently chosen; an alternate setting display field 75 indicating setting candidates similar to the current setting indicated in the current setting display field 74; a radio button 76*a* used to select the setting indicated in the current setting display field 74; radio buttons 76*b* to 76*d* used to select the settings indicated in the alternate setting display field 75; a selected-setting execution button 77 used to execute editing of the image data based on the settings selected by the radio buttons 73*a* to 73*d* and radio buttons 76*a* to 76*d*; and a detailed-setting execution button 78 used to execute editing of the image data after specifying detailed settings.

The radio button 73*a* is used to select "INTENSITY +2" to increase the intensity of an image in the form of image data by 2 levels. The radio button 73*b* is used to select "INTENSITY +3" to increase the intensity of the image in the form of image data by 3 levels. The radio button 73*c* is used to select "INTENSITY +1" to increase the intensity of the image in the form of image data by 1 level. The radio button 73*d* is used to select "SATURATION +2" to increase the saturation of the image in the form of image data by 2 levels. One of the radio buttons 73*a* to 73*d* is always selected.

The radio button 76*a* is used to select "MAGNIFICATION 50%" to reduce the image in the form of image data by 50%. The radio button 76*b* is used to select "MAGNIFICATION 60%" to reduce the image in the form of image data by 60%. The radio button 76*c* is used to select "MAGNIFICATION 40%" to reduce the image in the form of image data by 40%. The radio button 76*d* is used to select "LAYOUT 2 in 1" to lay out a 2-page image into a 1-page image. One of the radio buttons 76*a* to 76*d* is always selected.

The setting candidates for the current setting, which are similar to the current setting, are extracted by the control unit 18 using a specific algorithm. For example, a correlation table indicating the correlation between the current setting and the setting candidates similar to the current setting are stored in the storage unit 17. The control unit 18 can extract the setting candidates similar to the current setting based on the correlation table in the storage unit 17 and the current setting.

The setting change screen 70 shown in FIG. 10 shows up when the following two current settings are specified; "INTENSITY +2" denoting an increase of the intensity of an image in the form of image data by 2 levels; and "MAGNIFICATION 50%" denoting reduction in size of the image in the form of image data by 50%. In other words, the setting change screen 70 is a result of checking the checkbox 41*a* (see FIG. 5), selecting "+2" from the pull down menu 41*b* (see FIG. 5), checking the checkbox 44*a* (see FIG. 5), and selecting "50%" from the spin box 44*b* (see FIG. 5) on the edit function setting screen 40 (see FIG. 5) for the object edit function. The control unit 18 generates the setting change screen 70 based on the values and types of the current settings.

As shown in FIG. 9, after the process in S164, the control unit 18 determines whether the selected-setting execution button 77 has been depressed (S165).

If the control unit 18 determines in S165 that the selected-setting execution button 77 has been depressed, the control unit 18 edits the target image data based on the settings selected by using the radio buttons 73*a* to 73*d* and radio buttons 76*a* to 76*d* (S166).

If the control unit 18 determines in S165 that the selected-setting execution button 77 has not been depressed, the control unit 18 determines whether the detailed-setting execution button 78 has been depressed (S167).

If the control unit 18 determines in S167 that the detailed-setting execution button 78 has not been depressed, the control unit 18 executes the process in S165.

If the control unit 18 determines in S167 that the detailed-setting execution button 78 has been depressed, the control unit 18 accepts the settings of the edit function specified through the operation unit 11 (S168), and then edits the target image data based on the accepted settings (S169).

After completion of the process in S166 or S169, the control unit 18 stops displaying the setting change screen 70 on the display unit 12 (S170). Consequently, the progress status screen 60 is again displayed on the display unit 12.

After completion of the process in S163 or S170, the control unit 18 moves the execution position of the workflow 20 to the next function (S171) and terminates the edit processing shown in FIG. 9.

As shown in FIG. 7, if the control unit 18 determines that the function currently located in the execution position is not the edit function in S134 or if the edit processing in S135 has been completed, the control unit 18 determines whether the function currently located in the execution position of the workflow 20 is an execution result notification function (S136).

Figure 11:
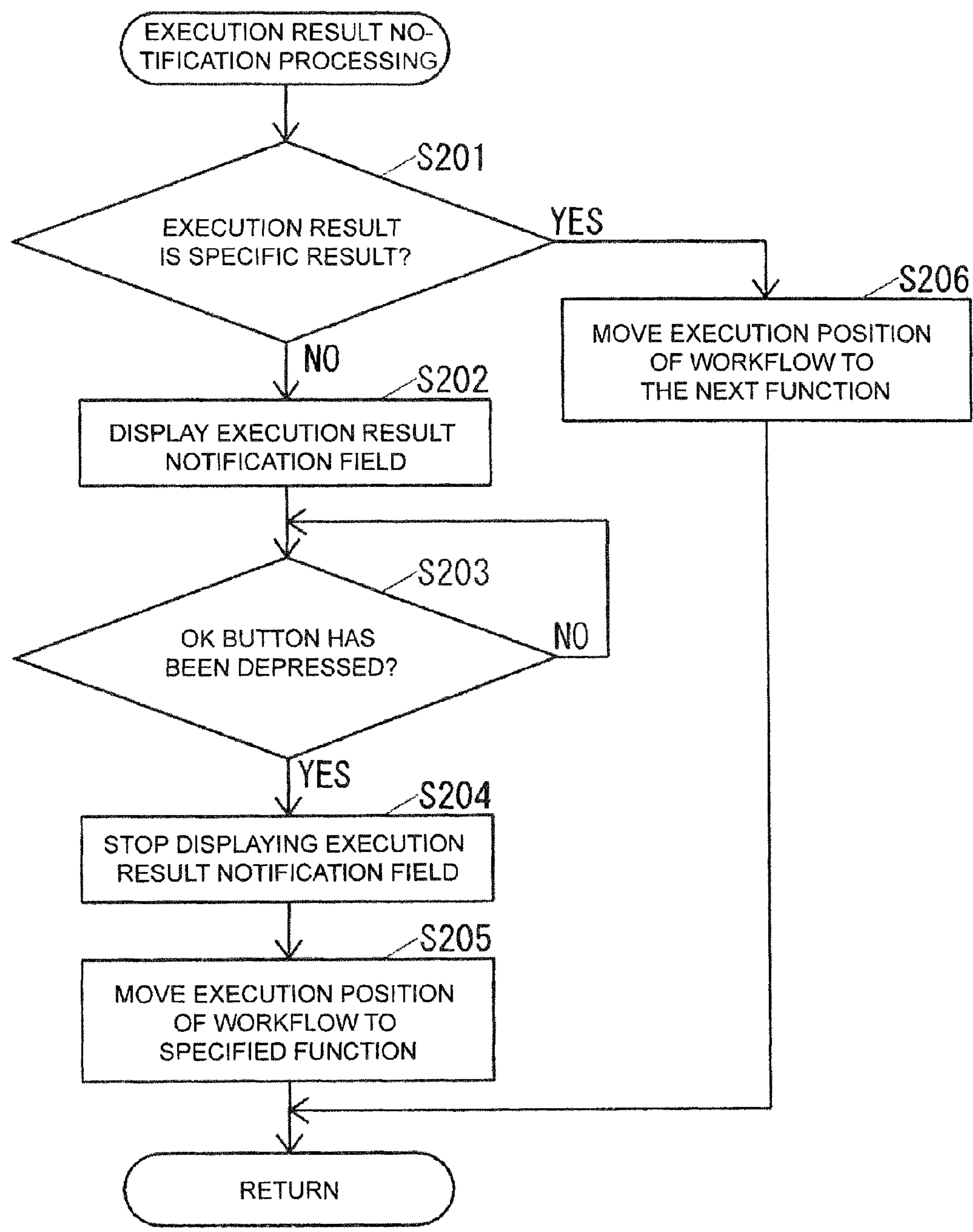
FIG. 11 is a flow chart of execution result notification processing shown in FIG. 7.

If the control unit 18 determines in S136 that the function currently located in the execution position is the execution result notification function, the control unit 18 executes the execution result notification function to perform execution result notification processing shown in FIG. 11 (S137).

FIG. 11 is a flow chart of the execution result notification processing shown in FIG. 7.

As shown in FIG. 11, the control unit 18 determines whether the functions executed before the execution result notification function (hereinafter, referred to as "object execution result notification function") currently located in the execution position of the workflow 20 provide a specific execution result, that is, an execution result satisfying the omit condition (S201). If the execution result obtained from the functions executed before the object execution result notification function does not satisfy the omit condition specified by checking the checkbox 51*a* (see FIG. 6) and selecting one option from the pull down menu 51*b* (see FIG. 6) on the execution result notification function setting screen 50 (see FIG. 6) for the object execution result notification function, the control unit 18 determines that the execution result is not the specific execution result in S201. In addition, if the execution result notification function settings are specified without a checkmark in the checkbox 51*a* on the execution result notification function setting screen 50 for the object execution result notification function, the control unit 18 determines that the execution result is not the specific execution result in S201 without regard for the execution result obtained from the functions executed before the object execution result notification function.

Figure 12:
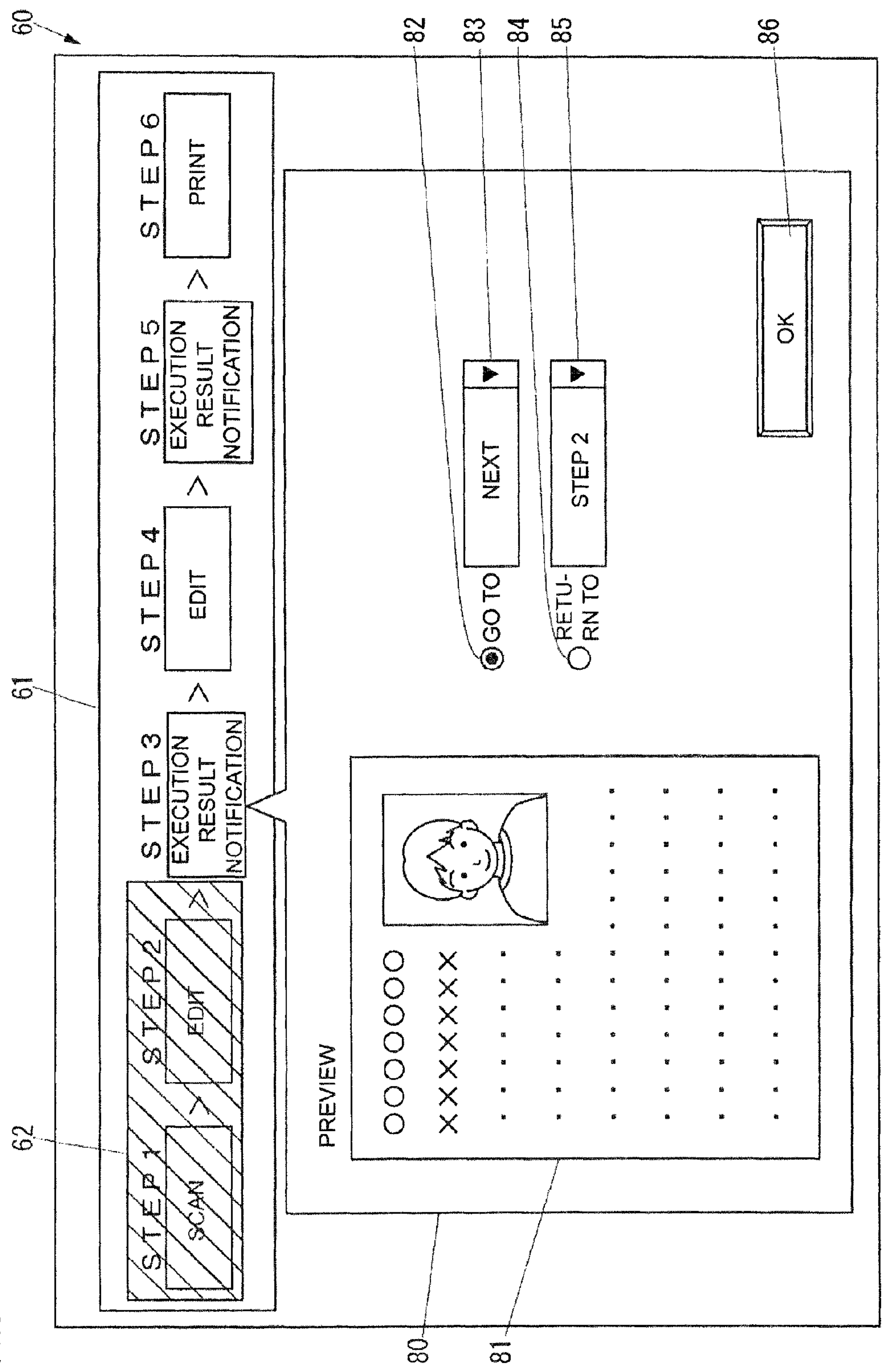
FIG. 12 illustrates the progress status screen shown in FIG. 8 with an execution result notification field displayed thereon.

If the control unit 18 determines that the specific result has not been obtained in S201, the control unit 18 displays an execution result notification field 80, as shown in FIG. 12, on the progress status screen 60 (S202). The execution result notification field 80 is associated with the current execution position in the workflow display field 61.

FIG. 12 shows an example of the progress status screen 60 with the execution result notification field 80 displayed thereon.

In FIG. 12, the execution result notification field 80 is associated with the execution result notification function in STEP 3. The execution result notification field 80 includes: a preview image 81 used to indicate the execution result obtained from the functions executed before the execution result notification function currently located in the execution position of the workflow 20; a radio button 82 used to move the execution position to the function after the execution result notification function currently located in the execution position of the workflow 20; a pull down menu 83 used to select a function to which the execution position is moved; a radio button 84 used to return the execution position to the function before the execution result notification function currently located in the execution position of the workflow 20; a pull down menu 85 used to select a function to which the execution position is returned; and an OK button 86 used to finish confirmation of the execution result.

One of the radio button 82 and radio button 84 is always selected.

The options listed in the pull down menu 83 include "NEXT", "STEP 5", and "STEP 6" in the execution result notification field 80 in FIG. 12. The control unit 18 configures the pull down menu 83 so as to include "STEP 5" and "STEP 6" in a situation where the execution result notification function settings are specified with a checkmark in the checkbox 53 (see FIG. 6) on the execution result notification function setting screen 50 (see FIG. 6) for the execution result notification function in STEP 3.

The options listed in the pull down menu 85 include "STEP 1" and "STEP 2" in the execution result notification field 80 in FIG. 12. The control unit 18 displays the radio button 84 and pull down menu 85 in a situation where the execution result notification function settings are specified with a checkmark in the checkbox 52 (see FIG. 6) on the execution result notification function setting screen 50 for the execution result notification function in STEP 3.

After completion of the process in S202, as shown in FIG. 11, the control unit 18 continues checking whether the OK button 86 has been depressed until it determines the depression of the OK button 86 (S203).

If the control unit 18 determines in S203 that the OK button 86 has been depressed, the control unit 18 stops displaying the execution result notification field 80 on the progress status screen 60 (S204).

Then, the control unit 18 moves the execution position of the workflow 20 to the function specified by using the radio button 82, pull down menu 83, radio button 84, and pull down menu 85 in the execution result notification field 80 (S205) and terminates the execution result notification processing in FIG. 11.

If the control unit 18 determines that the specific result has been obtained in S201, the control unit 18 moves the execution position of the workflow 20 to the next function (S206) and terminates the execution result notification processing in FIG. 11.

As shown in FIG. 7, if the control unit 18 determines that the function currently located in the execution position is not the execution result notification function in S136 or if the execution result notification processing in S137 has been completed, the control unit 18 determines whether the function currently located in the execution position of the workflow 20 is an output function (S138).

If the control unit 18 determines that the function currently located in the execution position is not the output function in S138, the control unit 18 executes the process in S134.

If the control unit 18 determines that the function currently located in the execution position is the output function in S138, the control unit 18 executes the output function (S139).

If the output function is a printing function, and the printing function settings, such as a paper cassette setting, are determined in advance, for example, the control unit 18 prints the target image data on a recording medium by the printer 14 based on the predetermined settings, including the paper cassette setting, thereby outputting the target image data. Input of the print function settings, such as the paper cassette setting, can be made through the operation unit 11 at the time of execution of the print function.

Alternatively, if the output function is a server output function, and the server output function settings, such as a server, communication mode, and path, are determined in advance, for example, the control unit 18 outputs the target image data by using the network communication unit 16 from the predetermined server, in the predetermined communication mode, to the predetermined path. Input of the server output function settings, including the setting of the server, communication mode, and path, can be made through the operation unit 11 at the time of execution of the server output function.

Alternatively, if the output function is a BOX output function, and the BOX output function settings, such as a file name, are determined in advance, for example, the control unit 18 outputs the target image data with the predetermined file name to a User Box of a user who has logged in to the MFP 10. Input of the BOX output function settings, including the setting of the file name, can be made through the operation unit 11 at the time of execution of the BOX output function.

After the process in S139, the control unit 18 stops displaying the progress status screen 60 on the display unit 12 (S140) and terminates the processing shown in FIG. 7.

The execution of the workflow 20 will be described below with reference to concrete examples.

The first example to be described is the workflow 20 shown in FIG. 2.

Note that the settings of both the execution result notification functions 23 and 25 are specified with an unchecked checkbox 51*a* and with checked checkboxes 52, 53 on the execution result notification function setting screen 50.

With the start of the workflow 20 in FIG. 2, the control unit 18 starts displaying a progress status screen 60 as shown in FIG. 8 on a display unit 12 (S131), executes a scanning function 21, which is an input function located at the first position of the workflow 20 to input image data (S132), and then moves the execution position of the workflow 20 to the next function, which is an edit function 22 (S133).

Then, the control unit 18 executes edit processing based on the edit function 22 (YES in S134 and S135). In the edit processing, since it is the first time to execute the edit function 22 (NO in S161), the control unit 18 edits target image data based on the settings of the edit function 22 (S162). After setting execution information to the edit function 22 (S163), the control unit 18 moves the execution position of the workflow 20 to the next function, which is an execution result notification function 23 (S171).

Then, the control unit 18 executes execution result notification processing based on the execution result notification function 23 (YES in S136 and S137). In the execution result notification processing, since the settings of the execution result notification function 23 are specified with an unchecked checkbox 51*a* on the execution result notification function setting screen 50 (NO in S201), the control unit 18 displays an execution result notification field 80, as shown in FIG. 12, on the progress status screen 60 (S202). If the control unit 18 determines that an OK button 86 in the execution result notification field 80 has been depressed (YES in S203), the control unit 18 stops displaying the execution result notification field 80 on the progress status screen 60 (S204), and moves the execution position of the workflow 20 to the function specified by the radio button 82, pull down menu 83, radio button 84 and pull down menu 85 on the execution result notification field 80 (S205). For example, if "STEP 2" is specified in the execution result notification field 80, the control unit 18 returns the execution position to the edit function 22, if "NEXT" is specified in the execution result notification field 80, the control unit 18 moves the execution position to the edit function 24, and if "STEP 6" is specified in the execution result notification field 80, the control unit 18 moves the execution position to a printing function 26, which is an output function.

If the execution position returns from the execution result notification function 23 to the edit function 22 (NO in S138 and YES in S134), the control unit 18 executes edit processing based on the edit function 22 (S135). In the edit processing, since it is not the first time to execute the edit function 22 (YES in S161), the control unit 18 displays a setting change screen 70, which is configured based on the current settings of the edit function 22, as shown in FIG. 10, on the display unit 12 (S164). If the control unit 18 determines that a selected-setting execution button 77 has been depressed on the setting change screen 70 (YES in S165), the control unit 18 edits the target image data based on the settings specified by using the radio buttons 73*a* to 73*d* and radio buttons 76*a* to 76*d* (S166). On the other hand, if the control unit 18 determines that a detailed-setting execution button 78 has been depressed on the setting change screen 70 (YES in S167), the control unit 18 accepts the settings of the edit function 22 specified through the operation unit 11 (S168), and then edits the target image data based on the accepted settings (S169). Upon completion of the process in S166 or S169, the control unit 18 stops displaying the setting change screen 70 on the display unit 12 (S170) and moves the execution position of the workflow 20 to the next function, which is the execution result notification function 23 (S171).

If the execution position proceeds from the execution result notification function 23 to the edit function 24 (NO in S138 and YES in S134), the control unit 18 executes edit processing based on the edit function 24 (S135). In the edit processing, if the edit function 24 is executed for the first time (NO in S161), the control unit 18 edits the target image data based on the settings for the edit function 24 (S162), sets execution information to the edit function 24 (S163), and then moves the execution position of the workflow 20 to the next function, which is an execution result notification function 25 (S171). On the other hand, if it is not the first time to execute the edit function 24 (YES in S161), the control unit 18 displays the setting change screen 70, which is configured based on the current settings of the edit function 24, on the display unit 12 (S164). If the control unit 18 determines that the selected-setting execution button 77 has been depressed on the setting change screen 70 (YES in S165), the control unit 18 edits the target image data based on the settings specified by using the radio buttons 73*a* to 73*d* and radio buttons 76*a* to 76*d* (S166). On the other hand, if the control unit 18 determines that the detailed-setting execution button 78 has been depressed on the setting change screen 70 (YES in S167), the control unit 18 accepts the settings of the edit function 24 specified through the operation unit 11 (S168), and then edits the target image data based on the accepted settings (S169). Upon completion of the process in S166 or S169, the control unit 18 stops displaying the setting change screen 70 on the display unit 12 (S170) and moves the execution position of the workflow 20 to the next function, which is an execution result notification function 25 (S171).

Figure 13:
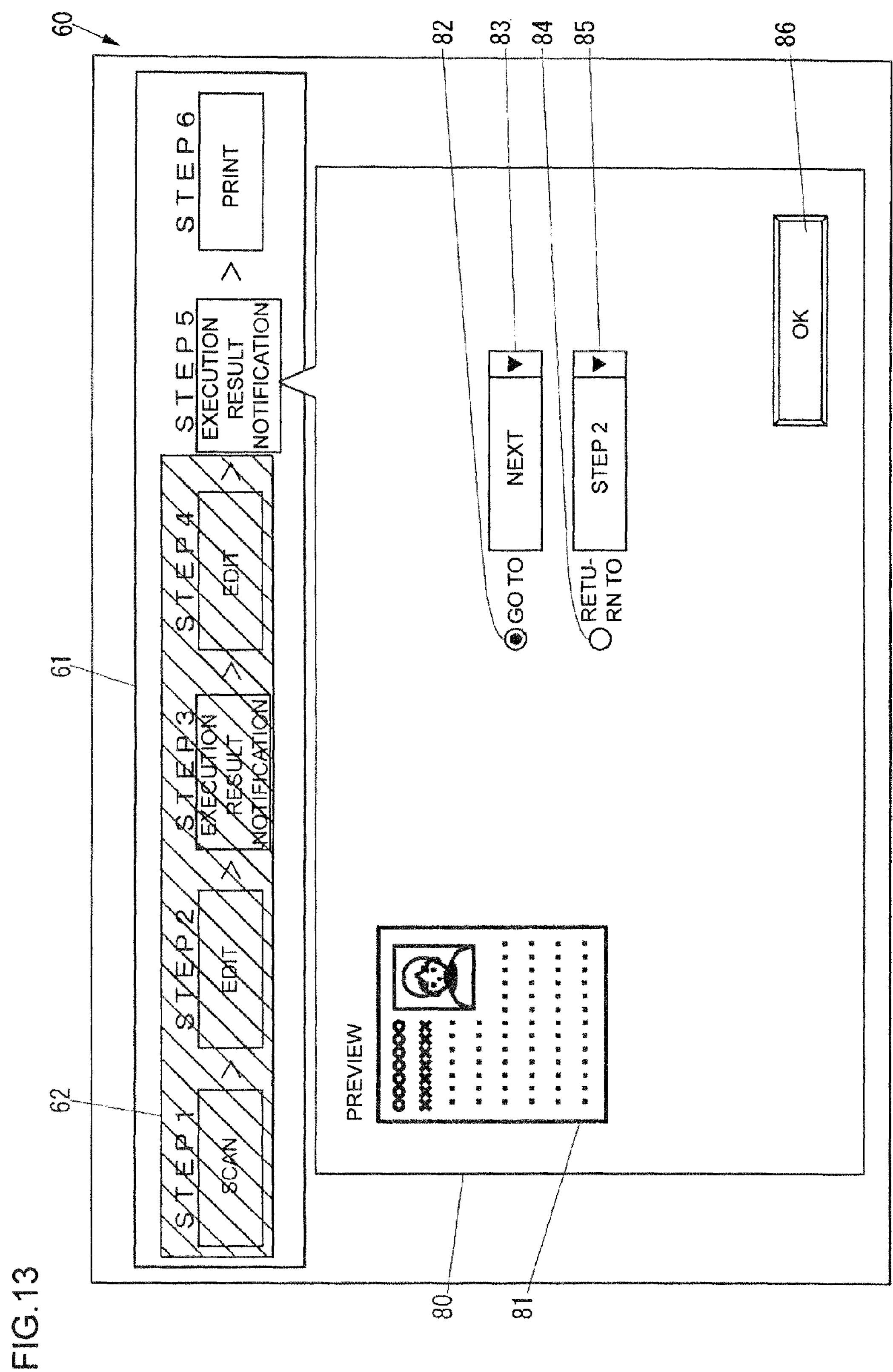
FIG. 13 illustrates the progress status screen shown in FIG. 8 with an execution result notification field displayed thereon, which is a different example from that in FIG. 12.

After moving the execution position of the workflow 20 to the execution result notification function 25, the control unit 18 executes execution result notification processing based on the execution result notification function 25 (YES in S136 and S137). In the execution result notification processing, since the settings of the execution result notification function 25 are specified with an unchecked checkbox 51*a* on the execution result notification function setting screen 50 (NO in S201), the control unit 18 displays an execution result notification field 80, as shown in FIG. 13, on the progress status screen 60 (S202). The execution result notification field 80 shown in FIG. 13 is the same as the execution result notification field 80 shown in FIG. 12, except that the preview image 81 is updated to reflect not only the edits made by the edit function 22, but also the edits made by the edit function 24, the option listed in the pull down menu 83 is only "NEXT", and the options listed in the pull down menu 85 are "STEP 1", "STEP 2", "STEP 3", and "STEP 4". If the control unit 18 determines that the OK button 86 has been depressed in the execution result notification field 80 (YES in S203), the control unit 18 stops displaying the execution result notification field 80 on the progress status screen 60 (S204), and moves the execution position of the workflow 20 to the function specified by using the radio button 82, pull down menu 83, radio button 84, and pull down menu 85 in the execution result notification field 80 (S205). For example, if "STEP 2" is specified in the execution result notification field 80, the control unit 18 returns the execution position to the edit function 22, if "STEP 4" is specified in the execution result notification field 80, the control unit 18 returns the execution position to the edit function 24, and if "NEXT" is not specified in the execution result notification field 80, the control unit 18 moves the execution position to the printing function 26.

If the execution position returns from the execution result notification function 25 to the edit function 22, the control unit 18 performs the same operation as when the execution position returns from the execution result notification function 23 to the edit function 22.

If the execution position returns from the execution result notification function 25 to the edit function 24 (NO in S138 and YES in S134), the control unit 18 executes edit processing based on the edit function 24 (S135). Since it is not the first time to execute the edit function 24 (YES in S161), the control unit 18 displays the setting change screen 70, which is configured based on the current settings of the edit function 24, on the display unit 12 (S164). If the control unit 18 determines that the selected-setting execution button 77 has been depressed on the setting change screen 70 (YES in S165), the control unit 18 edits the target image data based on the settings specified by using the radio buttons 73*a* to 73*d* and radio buttons 76*a* to 76*d* (S166). On the other hand, if the control unit 18 determines that the detailed-setting execution button 78 has been depressed on the setting change screen 70 (YES in S167), the control unit 18 accepts the settings of the edit function 24 specified through the operation unit 11 (S168), and then edits the target image data based on the accepted settings (S169). Upon completion of the process in S166 or S169, the control unit 18 stops displaying the setting change screen 70 on the display unit 12 (S170) and moves the execution position of the workflow 20 to the next function, which is the execution result notification function 25 (S171).

If the execution position proceeds from the execution result notification function 23 to the printing function 26 (YES in S138) or from the execution result notification function 25 to the printing function 26 (YES in S138), the control unit 18 executes the printing function 26 to output the image data (S139) and stops displaying the progress status screen 60 on the display unit 12 (S140), thereby completing the workflow 20 in FIG. 2.

Figure 14:
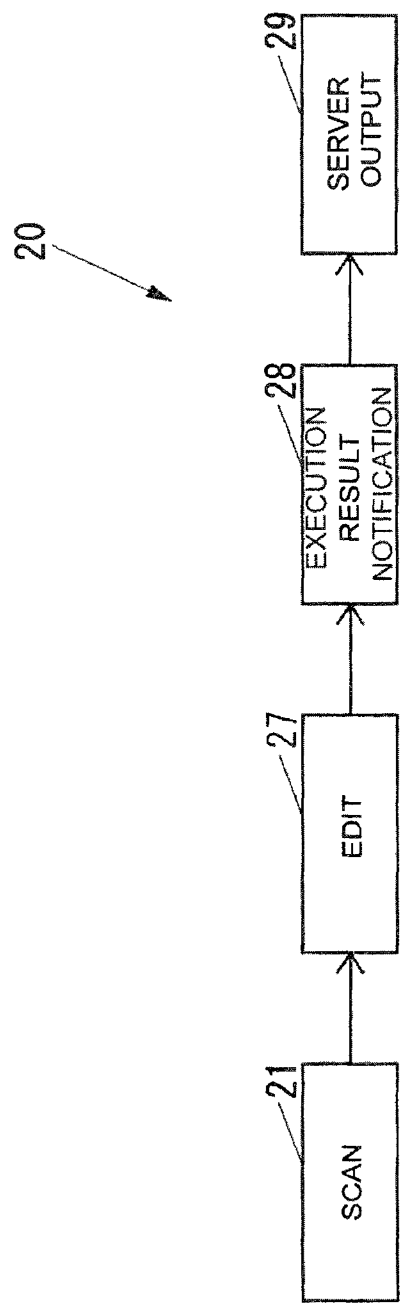
FIG. 14 illustrates a workflow generated by the MFP in FIG. 1, which is a different example from that in FIG. 2.

The second example to be described is the workflow 20 shown in FIG. 14.

The workflow 20 shown in FIG. 14 is composed of a plurality functions in combination to process image data. The functions include a scanning function 21 that reads image data from an original document by a scanner 13, an edit function 27 that edits the image data based on settings, an execution result notification function 28 that indicates an execution result obtained from the functions executed before the execution result notification function 28 in the workflow 20; and a server output function 29 that outputs the image data to an external server of the MFP 10 via a network communication unit 16.

On the edit function setting screen 40 used to specify the settings of the edit function 27, a checkbox 43*a* is checked and "600×600 dpi" is selected from a pull down menu 43*b*. On the execution result notification function setting screen 50 used to specify the settings of the execution result notification function 28, a checkbox 51*a* is checked, "2 MB" is selected from a pull down menu 51*b*, and a checkbox 51*c*, checkbox 51*d*, checkbox 52 and checkbox 53 are checked.

Figure 15:
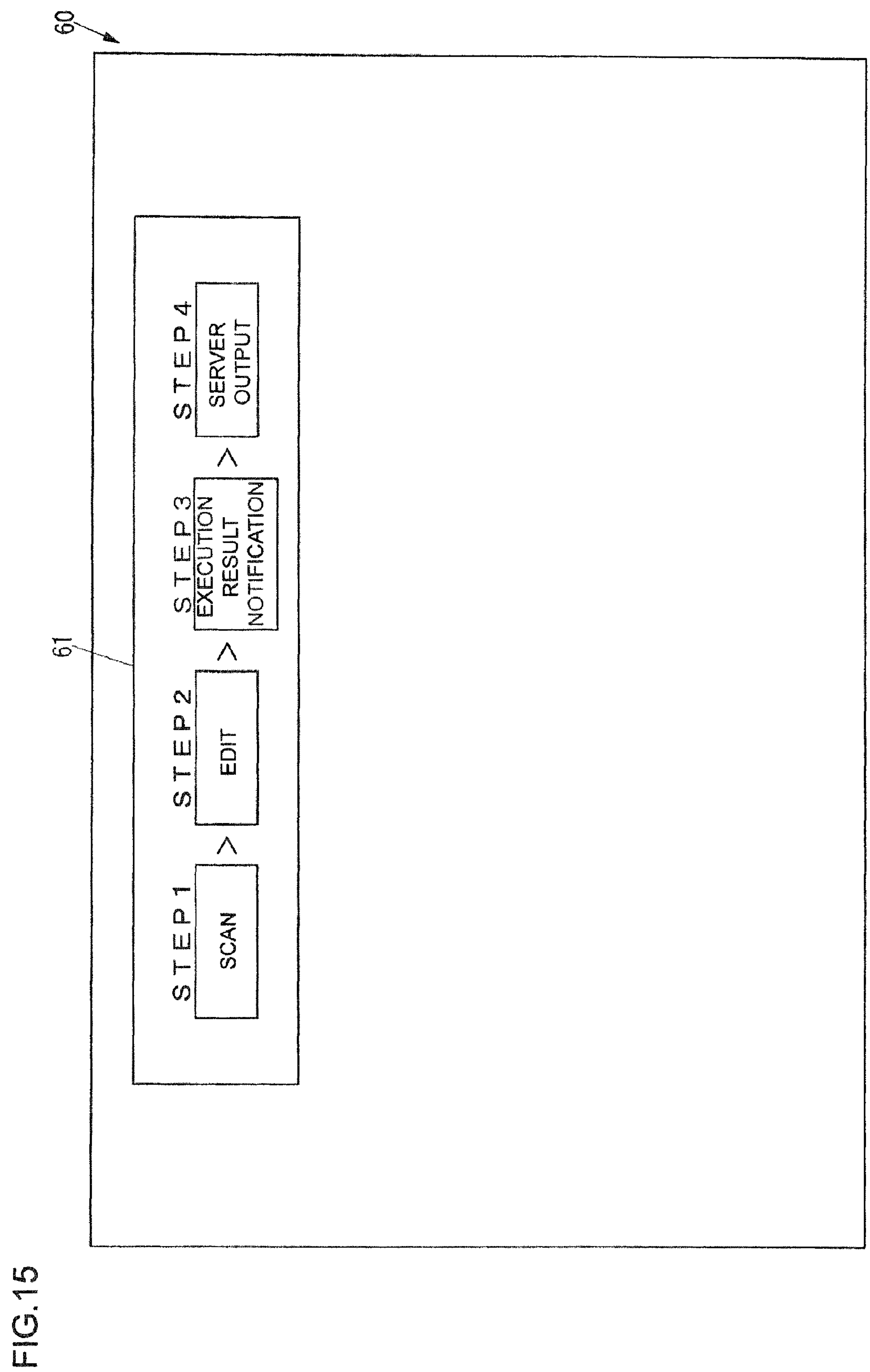
FIG. 15 illustrates a progress status screen displayed on the display unit in FIG. 1, which is a different example from that in FIG. 8.

With the start of the workflow 20 in FIG. 14, the control unit 18 starts displaying a progress status screen 60, as shown in FIG. 15, on the display unit 12 (S131), executes the scanning function 21, which is an input function located at the first position of the workflow 20, to input image data (S132), and then moves the execution position of the workflow 20 to the next function, which is the edit function 27 (S133).

Then, the control unit 18 executes edit processing based on the edit function 27 (YES in S134 and S135). In the edit processing, since it is the first time to execute the edit function 27 (NO in S161), the control unit 18 edits target image data based on the settings of the edit function 27 (S162). After setting execution information to the edit function 27 (S163), the control unit 18 moves the execution position of the workflow 20 to the next function, which is the execution result notification function 28 (S171).

Figure 16:
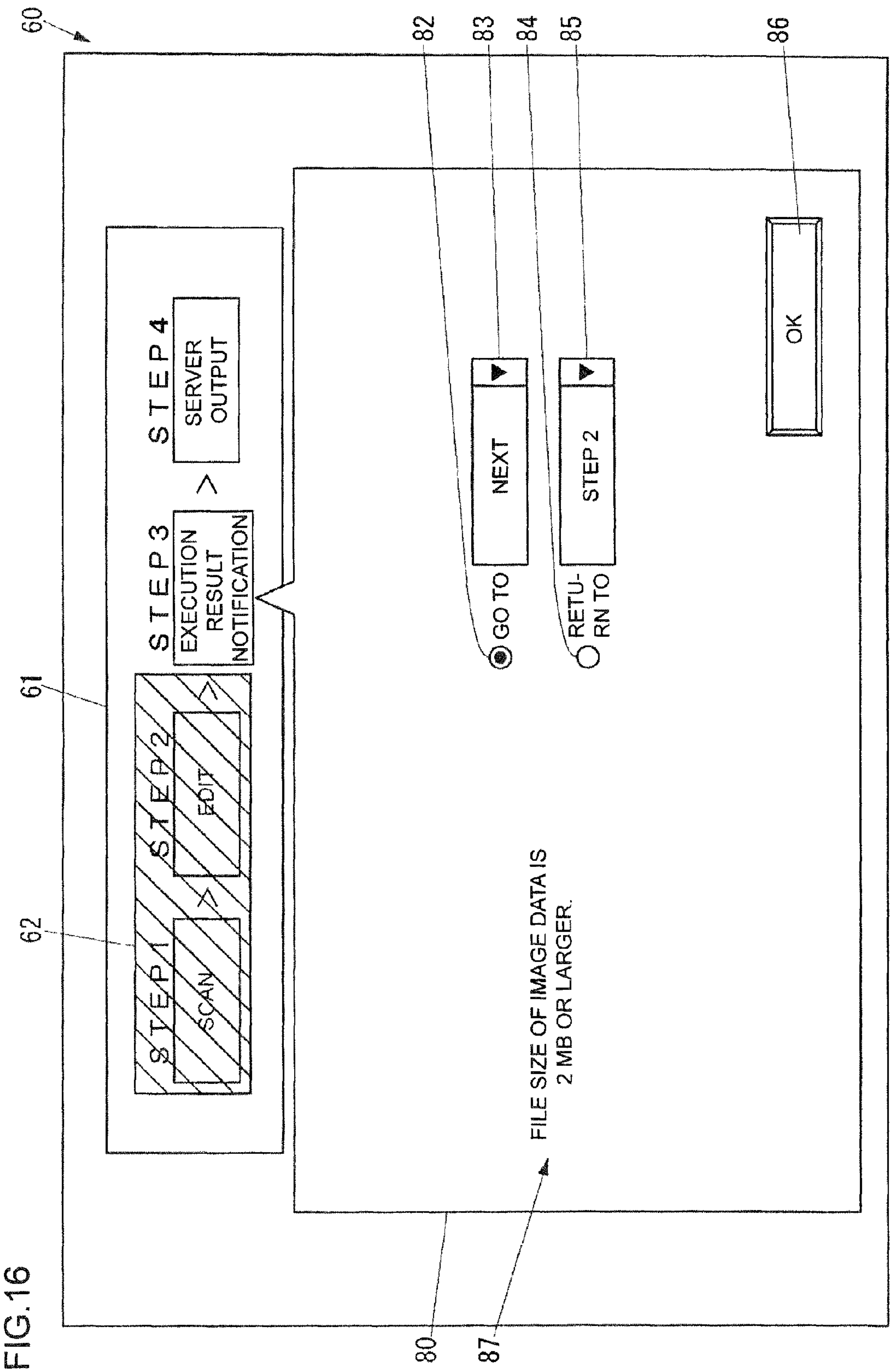
FIG. 16 illustrates the progress status screen shown in FIG. 15 with an execution result notification field displayed thereon.

Then, the control unit 18 executes execution result notification processing based on the execution result notification function 28 (YES in S136 and S137). In the execution result notification processing, since the checkbox 51*a* is checked and "2 MB" is selected from the pull down menu 51*b* on the execution result notification function setting screen 50 for the execution result notification function 28, if the functions executed before the execution result notification function 28 provide a specific result, that is, a result satisfying an omit condition that the file size of the image data is under 2 MB (YES in S201), the control unit 18 moves the execution position of the workflow 20 to the next function, which is a server output function 29 (S206) without displaying the execution result notification field 80 on the progress status screen 60. On the other hand, if the execution result obtained from the functions executed before the execution result notification function 28 does not satisfy the omit condition that the file size of the image data is under 2 MB (NO in S201), the control unit 18 displays the execution result notification field 80, as shown in FIG. 16, on the progress status screen 60 (S202). The execution result notification field 80 shown in FIG. 16 is the same as the execution result notification field 80 shown in FIG. 12 except that a notification message 87 that the omit condition is not satisfied appears instead of the preview image 81 (see FIG. 12) and the option listed in the pull down menu 83 is only "NEXT". If the control unit 18 determines that the OK button 86 has been depressed in the execution result notification field 80 (YES in S203), the control unit 18 stops displaying the execution result notification field 80 on the progress status screen 60 (S204), and moves the execution position of the workflow 20 to the function specified by using the radio button 82, pull down menu 83, radio button 84, and pull down menu 85 in the execution result notification field 80 (S205). For example, if "STEP 2" is specified in the execution result notification field 80, the control unit 18 returns the execution position to the edit function 27, while if "NEXT" is specified in the execution result notification field 80, the control unit 18 moves the execution position to the server output function 29.

Figure 17:
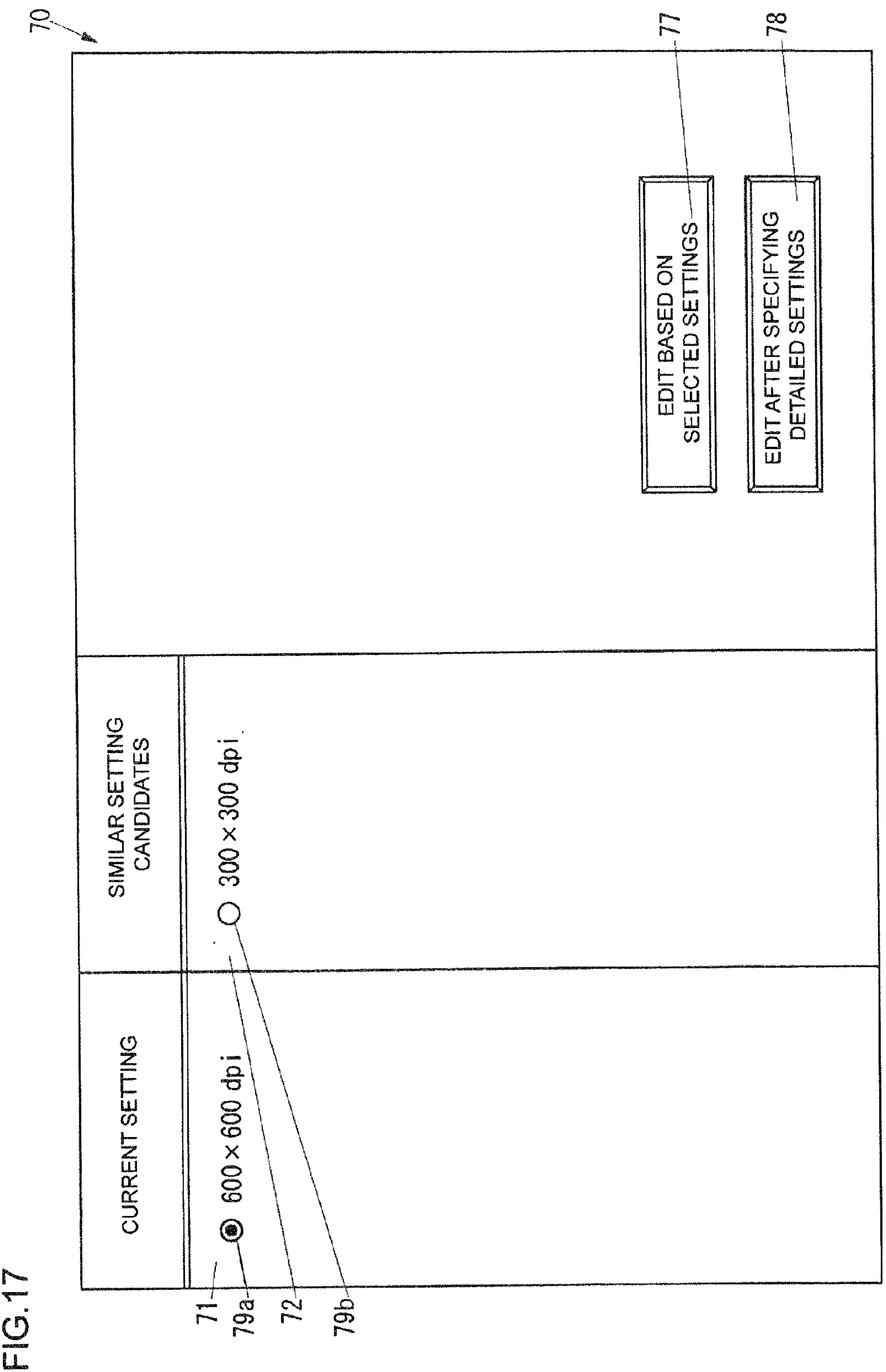
FIG. 17 illustrates a setting change screen displayed on the display unit shown in FIG. 1, which is a different example from that in FIG. 10.

If the execution position returns from the execution result notification function 28 to the edit function 27 (NO in S138 and YES in S134), the control unit 18 executes edit processing based on the edit function 27 (S135). In the edit processing, since it is not the first time to execute the edit function 27 (YES in S161), the control unit 18 displays a setting change screen 70, which is configured based on the current settings of the edit function 27, as shown in FIG. 17, on the display unit 12 (S164). The setting change screen 70 in FIG. 17 includes a radio button 79*a* used to set the resolution of the image in the form of image data to "600×600 dpi" and a radio button 79*b* used to set the resolution of the image in the form of image data to "300×300 dpi". One of the radio buttons 79*a* and 79*b* is always selected. The lower the resolution of the image in the form of image data is, the smaller the file size of the image data is. If the control unit 18 determines that a selected-setting execution button 77 has been depressed on the setting change screen 70 (YES in S165), the control unit 18 edits the target image data based on the settings specified by using the radio button 79*a* and 79*b* (S166). On the other hand, if the control unit 18 determines that a detailed-setting execution button 78 has been depressed on the setting change screen 70 (YES in S167), the control unit 18 accepts the settings of the edit function 27 specified through the operation unit 11 (S168), and then edits the target image data based on the accepted settings (S169). Upon completion of the process in S166 or S169, the control unit 18 stops displaying the setting change screen 70 on the display unit 12 (S170) and moves the execution position of the workflow 20 to the next function, which is the execution result notification function 28 (S171).

If the execution position proceeds from the execution result notification function 28 to the server output function 29 (YES in S138), the control unit 18 executes the server output function 29 to output the image data (S139) and stops displaying the progress status screen 60 on the display unit 12 (S140), thereby completing the workflow 20 in FIG. 14.

As described above, the settings of the edit function 22, 24 or 27 in the workflow 20 generated by the MFP 10 (S108) can be changed (S164 to S170) when the execution position (S205) is returned to the edit function 22, 24 or 27 in response to a return instruction accepted by the execution result notification function 23, 25 or 28 to execute the edit function 22, 24 or 27 (YES in S161). Thus, the workflow 20 generated by the MFP 10 can readily provide a desired execution result. In other words, the MFP 10 can generate the workflow 20 that can readily obtain a desired execution result.

The execution result notification function 25 in the workflow 20 generated by the MFP 10 (S108) allows users to select, for example, the edit function 22 or 24 from the pull down menu 85 as shown in FIG. 13 to return the execution position to the edit function 22 or 24 and to execute the edit function. Thus, the workflow 20 generated by the MFP 10 can readily provide a desired execution result. In other words, the MFP 10 can generate the workflow 20 that can readily obtain a desired execution result.

The MFP 10 is configured so that the execution position of the workflow 20 can be returned to any function located before the execution result notification function by manipulating the radio button 84 and pull down menu 85 in the execution result notification field 80. However, the MFP 10 can be configured so that the function to which the execution position is returned is selected from the functions before the execution result notification function on the execution result notification function setting screen 50.

In addition, the MFP 10 is configured so that when the execution position is returned from the execution result notification function 25 to the scanning function 21 or edit function 22, the settings of both the edit function 22 and edit function 24 can be changed. However, the MFP 10 can be configured so that users can select one of the edit functions 22 and 24 on the execution result notification function setting screen 50 to change the settings of the selected edit function when the execution position is returned from the execution result notification function.

The execution result notification function 23 in the workflow 20 generated by the MFP 10 (S108) indicates that it can accept a skip instruction to move the execution position to a function after the edit function 24, which is positioned immediately after the execution result notification function 23, by using the pull down menu 83 in the execution result notification field 80. Upon acceptance of the skip instruction, the execution position is moved to the function specified by the accepted skip instruction (S205), thereby skipping the later edit function 24 when the execution result obtained from the functions before the execution result notification function 23 is appropriate. Thus, the workflow 20 generated by the MFP 10 can readily provide a desired execution result. In other words, the MFP 10 can generate the workflow 20 that can readily obtain a desired execution result.

The MFP 10 is configured so that the execution position of the workflow 20 can be moved to any function after the function immediately after the execution result notification function by manipulating the radio button 82 and pull down menu 83 in the execution result notification field 80. However, the MFP 10 can be configured so that the function to which the execution position is moved is selected from the functions after the function immediately after the execution result notification function on the execution result notification function setting screen 50.

If the execution position is returned to the edit function 22, 24 or 27 in the workflow 20 generated by the MFP 10 (S108) in response to a return instruction accepted by the execution result notification function 23, 25 or 28 (S205) and then the edit function 22, 24 or 27 is executed (YES in S161), for example, the setting candidates similar to the current settings, as shown in FIGS. 10 and 17, are indicated (S164). Thus, the workflow 20 generated by the MFP 10 can readily provide a desired execution result. In other words, the MFP 10 can generate the workflow 20 that can readily obtain a desired execution result.

If the settings of the edit function 22, 24 or 27 in the workflow 20 generated by the MFP 10 (S108) are determined in advance and the execution result obtained by editing the image data based on the predetermined settings (NO in S161) is appropriate, there is no need to change the settings. Thus, the workflow 20 generated by the MFP 10 can readily provide a desired execution result. In other words, the MFP 10 can generate the workflow 20 that can readily obtain a desired execution result.

If the execution result obtained from the functions executed before the execution result notification function 28 is appropriate (YES in S201), the execution result notification function 28 in the workflow 20 generated by the MFP 10 (S108) omits displaying the execution result notification field 80 to omit an indication that it can accept a return instruction by using the radio button 84 and pull down menu 85, thereby not returning the execution position. Thus, the workflow 20 generated by the MFP 10 can readily provide a desired execution result. In other words, the MFP 10 can generate the workflow 20 that readily provides a desired execution result.

The display of the execution result notification field 80 is omitted under an omit condition, which is the file size of the image data, in this embodiment. However, the omit condition to omit displaying the execution result notification field 80 may be other than the file size of the image data. For example, the omit condition to omit displaying the execution result notification field 80 may include both the file size of the image data and the destination to which the server output function 29 outputs the image data. In the situation where the omit condition to omit displaying the execution result notification field 80 in the MFP 10 includes the file size of image data and the output destination of the server output function 29, for example, if image data of 2 MB or larger is transmitted to a server that cannot accept data of 2 MB or larger, the MFP 10 displays the execution result notification field 80, but the MFP 10 does not display the execution result notification field 80 if image data of under 2 MB is transmitted to the server, which are appropriate operations.

The MFP 10 in this embodiment can change the settings, “INTENSITY”, “SATURATION”, “RESOLUTION”, “MAGNIFICATION” and “LAYOUT”, of the edit function. However, the MFP 10 can be configured so as to change other settings of the edit function in addition to “INTENSITY”, “SATURATION”, “RESOLUTION”, “MAGNIFICATION” and “LAYOUT”. Examples of the changeable edit function settings by the MFP 10 are “HUE” used to change the hue of an image in the form of image data and “SUPERIMPOSE” used to superimpose an image in the form of image data on a desired background image.

In this embodiment, the MFP 10 displays the workflow edit screen 30, edit function setting screen 40, execution result notification function setting screen 50, progress status screen 60 and setting change screen 70 on the display unit 12, and those screens are operated through the operation unit 11. However, the MFP 10 can be configured to display at least one of the workflow edit screen 30, edit function setting screen 40, execution result notification function setting screen 50, progress status screen 60 and setting change screen 70 on a display unit of an external computer via the network communication unit 16 and to operate at least one of the workflow edit screen 30, edit function setting screen 40, execution result notification function setting screen 50, progress status screen 60 and setting change screen 70 through an operation unit of the external computer via the network communication unit 16.

Furthermore, the functions of the workflow 20 in this embodiment are limited to the functions available in the MFP 10. However, the MFP 10 can be configured so as to handle functions of the external computer as the functions of the workflow 20.

The electronic apparatus of the present disclosure is an MFP in this embodiment; however, the electronic apparatus can be any image forming apparatus other than the MFP, such as a printer, a copier, a facsimile, or can be any electronic apparatuses other than image forming apparatuses, such as a PC, as long as the electronic apparatus can generate workflows for processing data with a plurality of functions in combination.

The foregoing has described the embodiment of the present disclosure by referring to the drawings. However, the disclosure should not be limited to the illustrated embodiment. It should be appreciated that various modifications and changes can be made to the illustrated embodiment within the scope of the appended claims and their equivalents.

What is claimed is:

1. An electronic apparatus comprising:

a processor;

a function accepting unit that accepts functions; and a workflow generating unit that generates a workflow including a plurality of the functions accepted by the function accepting unit and processing data with the functions in combination, wherein the function accepting unit accepts an edit function for editing the data based on settings, and an execution result notification function for indicating an execution result obtained from the functions executed before the execution result notification function, the execution result notification function indicates that it can accept a return instruction that allows an execution position of the workflow to return to a function before the execution result notification function, and upon acceptance of the return instruction including any specified position before the execution result notification function, returns the execution position to a function specified by the accepted return instruction, the settings of at least one of the edit functions located between the function specified by the return instruction and the execution result notification function in the workflow can be changed when the execution position is returned in response to the return instruction, the data is edited based on the changed settings, and after the execution position is returned based on the return instruction, at least one of the edit functions located between the function specified by the return instruction and the execution result notification function in the workflow indicates that there is a setting candidate similar to the current setting, and if the edit function accepts a setting selection instruction to select the candidate, the edit function edits data based on the settings specified by the accepted setting selection instruction.

2. The electronic apparatus according to claim 1, wherein if at least one of the edit functions, which is located between the function specified by the return instruction and the execution result notification function in the workflow and has the settings changeable after the execution position is returned in response to the return instruction, is executed before the execution position is returned in response to the return instruction, the edit function edits data based on settings determined in advance.

3. The electronic apparatus according to claim 1, wherein the return instruction is configured so as to select a function to which the execution position is returned from the plurality of functions.

4. The electronic apparatus according to claim 1, wherein if the functions executed before the execution result notification function in the workflow provide a specific execution result, the execution result notification function omits indicating that it can accept the return instruction.

5. The electronic apparatus according to claim 4, wherein the function accepting unit accepts an output function of outputting the data as the function, and the specific execution result is an condition based on a file size of the data and an output destination of the data in the an output function.

6. The electronic apparatus according to claim 1, wherein the execution result notification function indicates that it can accept a skip instruction that allows the execution position of the workflow to move to a function after the function immediately after the execution result notification function, and upon acceptance of the skip instruction, moves the execution position to the function specified by the accepted skip instruction.

7. A non-transitory computer-readable recording medium on which is recorded a workflow generating program to cause an electric apparatus to generate a workflow for processing data with a plurality of functions in combination, the workflow generating program causing the electric apparatus to:

function as a function accepting unit that accepts functions and a workflow generating unit that generates a workflow including a plurality of the functions accepted by the function accepting unit, wherein the function accepting unit accepts an edit function for editing the data based on settings and an execution result notification function for indicating an execution result obtained from the functions executed before the execution result notification function, the execution result notification function indicates that it can accept a return instruction that allows an execution position of the workflow to return to a function before the execution result notification function, and upon acceptance of the return instruction including any specified position before the execution result notification function, returns the execution position to a function specified by the accepted return instruction, the settings of at least one of the edit functions located between the function specified by the return instruction and the execution result notification function in the workflow can be changed when the execution position is returned in response to the return instruction, the data is edited based on the changed settings, and after the execution position is returned based on the return instruction, at least one of the edit functions located between the function specified by the return instruction and the execution result notification function in the workflow indicates that there is a setting candidate similar to the current setting, and if the edit function accepts a setting selection instruction to select the candidate, the edit function edits data based on the settings specified by the accepted setting selection instruction.

8. A method for generating a workflow, the method being performed by an electronic apparatus that includes a function accepting unit that accepts functions and a workflow generating unit that generates the workflow, the workflow including a plurality of the functions accepted by the function accepting unit and processing data with the functions in combination, and the method comprising:

causing the function accepting unit to accept an edit function for editing the data based on settings and an execution result notification function for indicating an execution result obtained from the functions executed before the execution result notification function; and causing the execution result notification function to indicate that it can accept a return instruction that allows an execution position of the workflow to return to a function before the execution result notification function, and upon acceptance of the return instruction including any specified position before the execution result notification function, to return the execution position to a function specified by the accepted return instruction, wherein the settings of at least one of the edit functions located between the function specified by the return instruction and the execution result notification function in the workflow can be changed when the execution position is returned in response to the return instruction, the data is edited based on the changed settings, and after the execution position is returned based on the return instruction, at least one of the edit functions located between the function specified by the return instruction and the execution result notification function in the workflow indicates that there is a setting candidate similar to the current setting, and if the edit function accepts a setting selection instruction to select the candidate, the edit function edits data based on the settings specified by the accepted setting selection instruction.

* * * * *